(12) United States Patent
Coffman et al.

(10) Patent No.: US 7,137,126 B1
(45) Date of Patent: Nov. 14, 2006

(54) CONVERSATIONAL COMPUTING VIA CONVERSATIONAL VIRTUAL MACHINE

(75) Inventors: Daniel Coffman, Bethel, CT (US); Liam D. Comerford, Carmel, NY (US); Steven DeGennaro, Pauling, NY (US); Edward A. Epstein, Putnam Valley, NY (US); Ponani Gopalakrishnan, Yorktown Heights, NY (US); Stephane H. Maes, Danbury, CT (US); David Nahamoo, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/806,565

(22) PCT Filed: Oct. 1, 1999

(86) PCT No.: PCT/US99/22927

§ 371 (c)(1),
(2), (4) Date: Jul. 2, 2001

(87) PCT Pub. No.: WO00/20962

PCT Pub. Date: Apr. 13, 2000

Related U.S. Application Data

(60) Provisional application No. 60/117,595, filed on Jan. 27, 1999, provisional application No. 60/102,957, filed on Oct. 2, 1998.

(51) Int. Cl.
*G06F 9/54* (2006.01)
*G06F 9/50* (2006.01)
*G06F 9/44* (2006.01)
*G10L 15/00* (2006.01)

(52) U.S. Cl. .......................... 719/328; 719/310; 718/1; 718/108; 718/107; 718/102; 704/231; 704/200

(58) Field of Classification Search ................ 719/328, 719/310; 709/200–203, 217–226; 704/200, 704/231; 718/1
See application file for complete search history.

(56) References Cited

U.S. PATENT DOCUMENTS 5,133,004 A    7/1992   Heileman, Jr. et al.

(Continued)

OTHER PUBLICATIONS

Anderson, Eric et al. "The Performance of the Container Shipping I/O System." 1995.*

(Continued)

*Primary Examiner*—Lewis A. Bullock, Jr.
(74) *Attorney, Agent, or Firm*—F. Chau & Associates LLC; Frank V. DeRosa

(57) ABSTRACT

A conversational computing system that provides a universal coordinated multi-modal conversational user interface (CUI) (10) across a plurality of conversationally aware applications (11) (i.e., applications that "speak" conversational protocols) and conventional applications (12). The conversationally aware maps, applications (11) communicate with a conversational kernel (14) via conversational application APIs (13). The conversational kernel (14) controls the dialog across applications and devices (local and networked) on the basis of their registered conversational capabilities and requirements and provides a unified conversational user interface and conversational services and behaviors. The conversational computing system may be built on top of a conventional operating system and APIs (15) and conventional device hardware (16). The conversational kernel (14) handles all I/O processing and controls conversational engines (18). The conversational kernel (14) converts voice requests into queries and converts outputs and results into spoken messages using conversational engines (18) and conversational arguments (17). The conversational application API (13) conveys all the information for the conversational kernel (14) to transform queries into application calls and conversely convert output into speech, appropriately sorted before being provided to the user.

69 Claims, 12 Drawing Sheets

U.S. PATENT DOCUMENTS

| | | | |
|---|---|---|---|
| 5,255,305 | A | 10/1993 | Sattar |
| 5,283,888 | A | 2/1994 | Dao et al. |
| 5,384,890 | A * | 1/1995 | Anderson et al. ............ 704/200 |
| 5,600,765 | A * | 2/1997 | Ando et al. ................. 345/668 |
| 5,748,841 | A * | 5/1998 | Morin et al. ................ 704/257 |
| 5,748,974 | A * | 5/1998 | Johnson ......................... 704/9 |
| 5,794,205 | A | 8/1998 | Walters et al. |
| 5,850,629 | A * | 12/1998 | Holm et al. ................. 704/260 |
| 5,878,274 | A * | 3/1999 | Kono et al. .................... 710/8 |
| 5,884,266 | A | 3/1999 | Dvorak |
| 5,897,616 | A * | 4/1999 | Kanevsky et al. .......... 704/246 |
| 5,960,399 | A | 9/1999 | Barclay et al. |
| 6,012,030 | A * | 1/2000 | French-St. George et al. ......................... 704/275 |
| 6,018,711 | A | 1/2000 | French-St. George et al. ......................... 704/275 |
| 6,119,147 | A * | 9/2000 | Toomey et al. ............. 709/204 |
| 6,157,705 | A * | 12/2000 | Perrone ................... 379/88.01 |
| 6,195,696 | B1 * | 2/2001 | Baber et al. ................ 709/223 |
| 6,269,336 | B1 | 7/2001 | Ladd et al. |
| 6,377,913 | B1 * | 4/2002 | Coffman et al. ............... 704/8 |
| 6,385,583 | B1 | 5/2002 | Ladd et al. |
| 6,418,199 | B1 * | 7/2002 | Perrone ................... 379/88.01 |
| 6,438,523 | B1 * | 8/2002 | Oberteuffer et al. ........ 704/270 |
| 6,636,831 | B1 * | 10/2003 | Profit et al. ................. 704/275 |
| 6,704,807 | B1 * | 3/2004 | Mathur et al. .............. 719/328 |
| 6,738,803 | B1 * | 5/2004 | Dodrill et al. .............. 709/218 |
| 6,779,060 | B1 * | 8/2004 | Azvine et al. ................ 710/65 |
| 6,859,451 | B1 * | 2/2005 | Pasternack et al. ......... 370/352 |

OTHER PUBLICATIONS

Sun Microsystems. "Java Speech Markup Language Specification." 1997.*

Gourdol, Arno et al. "Two Case Studies of Software Architecture for Multimodal Interactive Systems: Voice-Paint and a Voice-enabled Graphical Notebook." Proceedings of the IFIP Working Conference on Engineering for Human Computer Interaction. 1992.*

Wilson, M.D. et al. "An Architecture for Mulimodal Dialogue." Venaco 2$^{nd}$ Multi-Modal Workshop '91.*

Glinert, Ephraim et al. "Adaptive Multimedia Interfaces in PolyMestra." 1996.*

Bellik, Yacine et al. "A Multimodal Dialogue Controller for Multimodal User Interface Management system Application: A Multimodal Window Manager." Apr. 1993.*

Blattner, Meera M. et al. "Multimodal Integration." IEEE. 1996.*

Torguet, Patrice et al. "A Software Architecture for Collaborative Virtual Prototyping." 1997.*

* cited by examiner

FIG. 7 Architecture for a Distributed CVM

CONVERSATIONAL COMPUTING VIA CONVERSATIONAL VIRTUAL MACHINE

This application is based on provisional applications U.S. Ser. No. 60/102,957, filed on Oct. 2, 1998, and U.S. Ser. No. 60/117,595 filed on Jan. 27, 1999.

BACKGROUND

1. Technical Field

The present application relates generally to systems and methods for conversational computing. More particularly, the present invention is directed to a CVM (conversational virtual machine) that may be implemented as either a stand-alone OS (operating system) or as a platform or kernel that runs on top of a conventional OS or RTOS (real-time operating system) possibly providing backward compatibility for conventional platforms and applications. A CVM as described herein exposes conversational APIs (application program interface), conversational protocols and conversational foundation classes to application developers and provides a kernel layer that is responsible for implementing conversational computing by managing dialog and context, conversational engines and resources, and conversational protocols/communication across platforms and devices having different conversational capabilities to provide a universal CUI (conversational user interface).

2. Description of Related Art

Currently, GUI (graphical user interface) based OSs (operating systems) are dominant in the world of PCS (personal computers) and Workstations as the leading architectures, platforms and OS are fundamentally GUI based or built around GUI kernels. Indeed, with the exception of telephony applications such as IVR (interactive voice response) where the UI is primarily voice and DTMF (dual tone multifrequency) I/O (input/output), the most common information access and management applications are built around the GUI paradigm. In addition, other non-GUI based UIs are utilized in connection with older architectures such as mainframes or very specialized systems. In general, with the GUI paradigm, the UI between the user and machine is graphic (e.g., Microsoft Windows or Unix-X Windows) and multi-tasking is provided by displaying each process as a separate window, whereby input to each window can be via a keyboard, a mouse, and/or other pointing devices such as a pen (although some processes can be hidden when they are not directly "interacting/interfacing" with the user).

GUIs have fueled and motivated the paradigm shift from time-shared mainframes to individual machines and other tiers such as servers and backend services and architectures. GUI based OSs have been widely implemented in the conventional PC client/server model to access and manage information. The information that is accessed can be local on the device, remote over the Internet or private intranets, personal and located on multiple personal PCS, devices and servers. Such information includes content material, transaction management and productivity tools. However, we are witnessing a new trend departing from the conventional PC client/server model for accessing and managing information towards billions of pervasive computing clients (PvC clients) that are interconnected with each other thereby allowing users to access and manage information from anywhere, at anytime and through any device. And this access to information is such that the interface to it is the same independently of the device or application that is used. This trends goes in pair with miniaturization of the devices and dramatic increase of their capabilities and complexity.

Simultaneously, because the telephone is still the most ubiquitous communication device for accessing information, the same expectation of ubiquitous access and management to information through the telephone becomes even stronger.

Unfortunately, access to such information is limited by the available devices or the interface, and the underlying logic is completely different depending on the device. Indeed, the variety and constraints met in the embedded world have no comparison with what is met in the other tiers, i.e. desktop, workstations and backend servers and, thus, the embedded world poses a real challenge to UIs. Moreover, the increasing complexity of PvC clients coupled with increasingly constrained input and output interface significantly reduces the effectiveness of GUI. Indeed, PvC clients are more often deployed in mobile environment where user desire hand-free or eye-free interactions. Even with embedded devices which provide some constrained display capabilities, GUIs overload tiny displays and hog scant power and the CPU resources. In addition, such GUIs overwhelm and distract the user fighting the constrained interface. Furthermore, the more recently formulated need for ubiquitous interfaces to access and manage information anytime from anywhere through any device reveals the GUI limitations.

Recently, voice command and control (voice C&C) UIs are emerging everywhere computers are used. Indeed, the recent success of speech recognition as shrink wrap retail products and its progressive introduction as part of the telephony IVR (interactive voice response) interface has revealed that speech recognition will become a key user interface element. For instance, telephone companies, call centers and IVR have implemented speech interfaces to automate certain tasks, reduce their operator requirements and operating costs and speed-up call processing. At this stage, however, IVR application developers offer their own proprietary speech engines and APIs (application program interface). The dialog development requires complex scripting and expert programmers and these proprietary applications are typically not portable from vendor to vendor (i.e., each application is painstakingly crafted and designed for specific business logic).

In addition, speech interfaces for GUI based OSs have been implemented using commercially available continuous speech recognition applications for dictation and command and control. These speech applications, however, are essentially add-ons to the GUI based OSs in the sense that such applications allow for the replacement of keyboard and mouse and allows a user to change the focus, launch new tasks, and give voice commands to the task in focus. Indeed, all of the current vendors and technology developers that provide such speech interfaces rely on incorporating speech or NLU (natural language understanding) as command line input to directly replace keyboards or pointing devices to focus on and select from GUI menus. In such applications, speech is considered as a new additional I/O modality rather than the vector of a fundamental change in the human/machine interaction.

The implementation of speech, NLU or any other input/output interfaces as a conversational system should not be limited to superficial integration into the operating system. Nor should it be limited to a ubiquitous look and feel across embedded devices. Instead it should fundamentally modify the design of the underlying operating system and computing functions. Furthermore, flexibility on the input and output media imposes that the most fundamental changes in the operating system do not require speech input/output but can also be implemented with more conventional keyboard, mouse or pen input and display output.

Accordingly, a system that provides conversational computing across multiple platforms, devices and application through a universal conversational user interface, which goes far beyond adding speech I/O or conversational capabilities to existing applications, building conventional conversational applications or superficially integrating "speech" in conventional operating systems, is highly desirable.

SUMMARY OF THE INVENTION

The present invention is directed to a system and method based on a conversational computing paradigm that provides conversational computing through a universal conversational user interface (CUI). The conversational computing paradigm prescribes that systems dialog with a user to complete, disambiguate, summarize or correct queries and the result of their executions. They abstract and handle queries, contexts, and manipulated information based on contexts, applications, history and user preferences and biometrics. These core principles do not require speech enabled I/O interfaces, they rather deeply permeate the underlying computing cores. Indeed, the conversational computing paradigm according to the present invention applies even in the absence of speech and describes the essence of computing built around dialogs and conversations, even if such dialogs are carried over, e.g., a keyboard. It is the conversational computing paradigm that allows a user to seamlessly control multiple Windows applications, for example, running in parallel, even through a dummy terminal display such as VT 100 or a Palm Pilot screen.

In one aspect of the present invention, a system for providing conversational computing based on the conversational paradigm is a CVM (conversational virtual machine) that is implemented either as a stand-alone OS (operating system) or as a platform or kernel that runs on top of a conventional OS or RTOS (real-time operating system) possibly providing backward compatibility for conventional platforms and applications. The CVM exposes conversational APIs (application program interface), conversational protocols and conversational foundation classes to application developers and provides a kernel that is responsible for implementing conversational computing by managing dialog and context, conversational engines and resources, and conversational protocols/communication across platforms and devices having different conversational capabilities to provide a universal CUI (conversational user interface). The CVM kernel is the core layer that controls the dialog across applications and devices on the basis of their registered conversational capabilities and requirements. It also provides a unified conversational user interface that goes far beyond adding speech as I/O modality to provide conversational system behaviors. The CVM is capable of managing tasks in a manner similar to conversations with the power of discourses, contexts, mixed initiatives and abstraction.

In one aspect of the present invention, the CVM utilizes conversational subsystems (which may be local or distributed) including speech recognition, speaker recognition, text-to-speech, natural language understanding and natural dialog generation engines to understand and generate dialog between and user and machine. These subsystem are accessed through the CVM. The engines are hidden to the application through the conversational application APIs. The CVM may control such engines through the conversational engine APIs. In addition, the conversational application APIs may include the conversational engine APIs. Typically, CVM includes direct exposure of these engine APIs to the application developer. This may be done by having the conversational engine APIs included in the conversation application APIs or by emulating similar calls and functionalities at the level of the conversational application APIs.

In another aspect, a CVM kernel layer (or CVM controller) comprises a meta-information manager, a resource manager, a context stack, a global history, a dialog manager and a task dispatcher, for managing the dialog and selecting the active dialog, context, and application. The context stack accumulates the context (full query arguments and state/mode—i.e. query arguments already introduced, any I/O event, and event produced by an application) of each active process with an activated discourse along with any data needed for input understanding (e.g. active FSG, topic, vocabulary or possible queries for a speech input). The CVM kernel coordinates the different tasks and processes that are spawned on local and networked conventional and conversational resources. The CVM kernel layer keeps track of these resources, transmit input to the appropriate conversational subsystems and arbitrate between devices, state and applications. The CVM kernel layer also coordinates the output generation and prioritization according to the active conversation and conversation history, delayed returns, delegation across network resources and task delegation and memorization.

In another aspect of the invention, the CVM system provides a high level of abstraction and abstract categories via meta-information that is associated with elements such as objects, data stream handles, networks, peripherals, hardware and local and networked file system. An abstract meta-information system according to one aspect of the invention includes multiple categories defined by the owner/developer of the resources or past user/application of the resource. Such elements are accessible through abstract shortcuts and mixed initiative requests. A registration protocol is provided to automatically create new categories associated with new objects upon connection or via a meta-information server (analogous to a DNS server or name space manager) which updates the list of abstract categories associated to an object or its content, and acts like a table of abstractions to which each resource registers its capabilities. Objects that are downloaded or forwarded can register locally using the same protocol. The abstract meta-information can be used to either shortcut, automatically extract, or process elements of the network.

In another aspect, the CVM provides the capability to have natural dialog with NLU, NLG, contexts and mixed-initiatives sorted across multiple tasks, processes and discourses (with multiple domains). A conversational input interface is provided whereby a set of multi-mode input streams are each transcribed into an ASCII command or query (i.e., lists of attribute-value pairs or n-uples). Each input entity (command, NLU query field or argument unit (isolated letter, word, etc.) is associated with time-marks and appended accordingly to a compounded input stream. Two or more stream having the same time-marks are prioritized based on when each input stream contributed previously or the priority that each application/input stream received on the basis of the context history. Compounded inputs are checked against possible FSG and dictionaries and optionally fed back to the user. Each resource exchanges their conversational capabilities and the input stream is tailored to only exchange relevant information.

In still another aspect, conversational output dispatches and interface protocols are provided whereby the output of multiple tasks are queued to mono-channel output based the context stack and the task dispatcher. A mechanism is provided to redirect or modify the resource assigned to each input streams, even in multiplexed cases. Each resource exchanges its conversational capabilities and the output stream is tailored to only exchange relevant information, including selection of the output Voice fonts and formatting of conversational presentations.

In another aspect, programming/script languages are utilized that allow the use of any available resources as input or output stream. Using the conversational sub-systems, each input is converted into a binary or ASCII input (lists of attribute-value pairs or n-uples), which can be directly processed by the programming language as built-in objects. Calls, flags and tags are automatically included to transmit between object and processes the conversational meta-information required to correctly interface with the different objects. Indeed, any input in any modality is captured by the dialog manager of the CVM kernel layer as an event that is added to the associated context or context stack. For example, a mouse click or pointer/stylus pointing action followed by the command "I would like to open this" is disambiguated into a set of attribute value pairs: Command: open, Object: Windows or task selected by the last mouse click. Output can be specially formatted according to the needs of the application or user. Multi-modal discourse processing can now be easily built using the new programming tools. In addition, such programming languages and scripts encompasses conversational API between conversational enabled applications and the CVM, as well as CML (conversational markup language).

In yet another aspect, conventional logic statement status and operators are expanded to handle the richness of conversational queries that can be compared on the bases of their ASCII/binary content or on the basis of their NLU-converted query/list of attribute value n-uples. Logic operators are implemented to test or modify such systems.

In another aspect, conversational network connection protocols are provided which allow multiple conversational devices or applications to register their conversational capabilities, including silent partners that are only conversationally aware.

Conversational protocols are provided to coordinate a conversation with multiple CVMs and silent partners, such that when multiple CVM devices are conversationally connected and coordinated, it becomes possible to simultaneously control them through one single interface (e.g., through a single microphone). After discovering each other and registering their identification, each system or device exchanges information about their conversational capabilities to limit data transfer to relevant information. Silent conversational partners behave similarly and can interact through a conversational proxy server or as conversational client of a CVM. The coordination between multiple CVM may involve dynamic master-slave and peer-to-peer interactions to provide a coordinated uniform conversational interface presented by multiple conversationally connected devices/objects. In addition, other topologies may be considered, including multiple local masters (optimized or decided upon to reduce the overall network traffic and dialog flow delays) interacting among each other on a peer-to-peer basis. The collection of objects present a single coordinated interface to the user through centralized or distributed context stacks.

In yet another aspect, development tools are provided for developer to build, simulate and debug conversational aware application for CVM. The development tools offer direct implementation of the API calls, protocol calls, application using these API's and protocols, and linking associated libraries, applications exploiting the services and behaviors offered by CVM. These development tools allow advanced conversational interfaces to be constructed with multiple personalities, such as Voice fonts, which allows the user to select the type of voice providing the output. Conversational formatting languages are provided which builds conversational presentations such as Postcript and AFL (audio formatting languages). The code implementing these applications can be declarative or procedural. This comprises interpreted and compiled scripts and programs, with library links, conversational logic, engine calls, and conversational foundation classes. Conversational foundation classes are the elementary components or conversational gestures that characterize any dialog, independently of the modality or combination of modalities.

In still another aspect, conversational security is provided using meta-information about the author and/or modifier of local or remote files, especially executables, for preventing unauthorized access. CVM provides automatic authentication of the user whenever a query to a restricted resource is made, based on security meta-information associated to the resource. The authentication is performed directly on the request or non-expired information acquired shortly before the query.

In another aspect, the CVM provides conversational customization. A user is automatically identified whenever a query to a resource is made. The authentication is performed directly on the request or non-expired information acquired shortly before the query. Each task or resource access can be individually customized to the requester preferences. Tasks and contexts are prioritized according to the sequence of active users and re-prioritized at each user changes. Environment variables can be modified on the fly based on changes of the user identity without requiring to reset the whole environment. Ambiguity is resolved at the level of each context or the context stack using the user identity.

In still another aspect, conversational search capability is provided based not only on the name, modification or ASCII content of files but also on abstract categories defined by the operating system, the application or the user and topics extracted on-line or off-line by the operating system, or obtained via conversational protocols when the object was accessed. In addition, contextual search capabilities are provided to complete active query or to extract similar queries/context.

In another aspect, conversational selection capabilities are provided at the resource manager level or within any application relying on meta-information, abstraction and conversational queries/mixed initiative/correction. Such conversational selection capabilities avoid long sequences of elementary selections and provide natural shortcuts and correction of the selection. In addition, mechanisms are provided to access and present immediately the skeleton of objects with hierarchical structures.

In yet another aspect, conversational help, manuals and support is provided through a ubiquitous coordinated conversational interface, using local and remote resources, usage history of a user and agents to complete request, guide through procedure, search for information and upgrade/install new applications. In addition, help information can be accessed using NLU queries to access the help information or on the basis of the meta-information associated to the current user (history) and on the basis of the arguments that are missing or modified using mixed initiative. The dialog provided by each application is tuned to the preferences or level of expertise of the user.

Other features provided by a CVM according to the present invention include simple, intuitive and natural interfaces with minimum learning curves, compelling conversational applications where the use of speech greatly improve productivity or new functions or uses, clever machines/ devices able to understand natural queries, possibilities to conduct efficiently task in hand-free and/or eye-free mode, compelling multi-mode productive user interfaces complementing conventional user I/O and replacing them when needed (no display or small display, no keyboard, pen or pointing device, remote computing, etc.), universal user interface independently of the device (PC, PDA, phone, etc.) used to access and independently of the transaction/service/ application, and a coordinated interface across multiple conversational devices allowing one device to control multiple other devices, backward compatibility with existing OSs, applications, devices and services.

These and other aspects, features and advantages of the present invention will be described and become apparent from the following detailed description of preferred embodiments, which is to be read in connection with the accompanying drawings

DETAILED DESCRIPTION OF PREFERRED EMBODIMENTS

Figure 1:
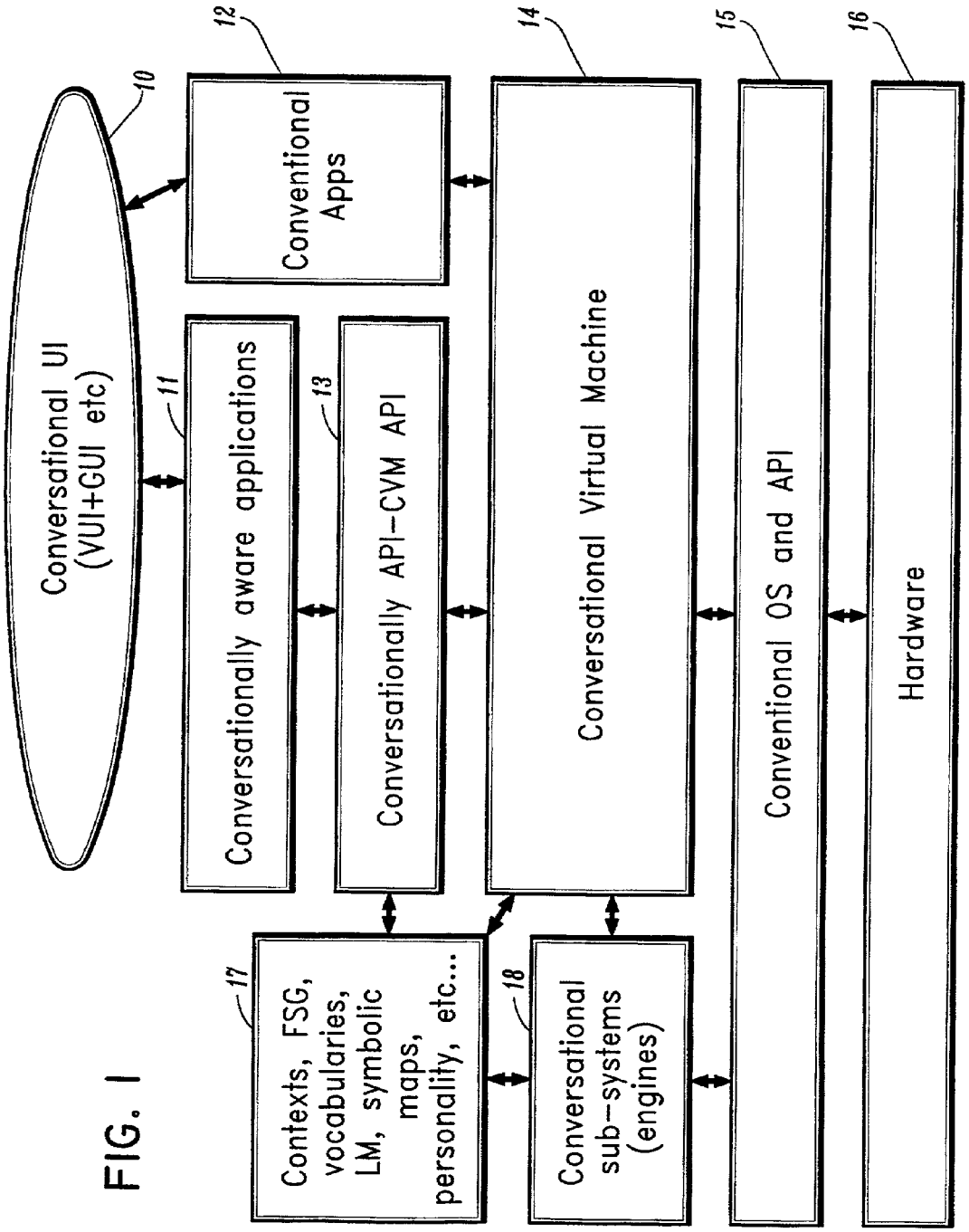
FIG. 1 is a block diagram of a conversational computing system according to an embodiment of the present invention.

The present invention is directed to system and method for conversational computing which incorporates all aspects of conversational systems and multi-modal interfaces. A key component for providing conversational computing according to a conversational computing paradigm described herein is a CVM (conversational virtual machine). In one embodiment, the CVM is a conversational platform or kernel running on top of a conventional OS or RTOS. A CVM platform can also be implemented with PvC (pervasive computing) clients as well as servers. In general, the CVM provides conversational APIs and protocols between conversational subsystems (e.g. speech recognition engine, text-to speech etc.) and conversational and/or conventional applications. The CVM may also provide backward compatibility to existing applications, with a more limited interface. As discussed in detail below, the CVM provides conversational services and behaviors as well as conversational protocols for interaction with multiple applications and devices also equipped with a CVM layer, or at least, conversationally aware.

It is to be understood that the different elements and protocol/APIs described herein are defined on the basis of the function that they perform or the information that they exchange. Their actual organization or implementation can vary, e.g., implemented by a same or different entity, being implemented a component of a larger component or as an independently instantiated object or a family of such objects or classes A CVM (or operating system) based on the conversational computing paradigm described herein according to the present invention allows a computer or any other interactive device to converse with a user. The CVM further allows the user to run multiple tasks on a machine regardless if the machine has no display or GUI capabilities, nor any keyboard, pen or pointing device. Indeed, the user can manage these tasks like a conversation and bring a task or multiple simultaneous tasks, to closure. To manage tasks like a conversation, the CVM in accordance with the present invention affords the capability of relying on mixed initiatives, contexts and advanced levels of abstraction, to perform its various functions. Mixed initiative allows a user to naturally complete, modify, or correct a request via dialog with the system. Mixed initiative also implies that the CVM can actively help (take the initiative to help) and coach a user through a task, especially in speech-enable applications, wherein the mixed initiative capability is a natural way of compensating for a display less system or system with limited display capabilities. In general, the CVM complements conventional interfaces and user input/output rather than replacing them. This is the notion of "multi-modality" whereby speech is used in parallel with mouse, keyboard, and other input devices such as a pen. Conventional interfaces can be replaced when device limitations constrain the implementation of certain interfaces. In addition, the ubiquity and uniformity of the resulting interface across devices, tiers and services is an additional mandatory characteristic. It is to be understood that CVM system can to a large extent function with conventional input and/or output media. Indeed, a computer with classical keyboard inputs and pointing devices coupled with traditional monitor display can profit significantly by utilizing the CVM according to the present invention. One example is described in provisional application U.S. Ser. No. 60/128,081, filed on Apr. 7, 1999, entitled "Multi-Modal Shell" which is commonly assigned and incorporated herein by reference (which describes a method for constructing a true multi-modal application with tight synchronization between a GUI modality and a speech modality). In other words, even users who do not want to talk to their computer can also realize a dramatic positive change to their interaction with the CVM enabled machine.

Referring now to FIG. 1, a block diagram illustrates a conversational computing system (or CVM system) according to an embodiment of the present invention, which may be implemented on a client device or a server. In general, the CVM provides a universal coordinated multi-modal conversational user interface (CUI) 10. The "multi-modality" aspect of the CUI implies that various I/O resources such as voice, keyboard, pen, and pointing device (mouse), keypads, touch screens, etc can be used in conjunction with the CVM platform. The "universality" aspect of the CUI 10 implies that the CVM system provides the same UI to a user whether the CVM is implemented in connection with a desktop computer, a PDA with limited display capabilities, or with a phone where no display is provided. In other words, universality implies that the CVM system can appropriately handle the UI of devices with capabilities ranging from speech only to speech to multi-modal, i.e., speech+GUI, to purely GUI. Therefore, the universal CUI provides the same UI for all user interactions, regardless of the access modality.

Moreover, the concept of universal CUI extends to the concept of a coordinated CUI. In particular, assuming a plurality of devices (within or across multiple computer tiers) offer the same CUI, they can be managed through a single discourse—i.e., a coordinated interface. That is, when multiple devices are conversationally connected (i.e., aware of each other), it is possible to simultaneously control them through one interface (e.g., single microphone) of one of the devices. For example, voice can automatically control via a universal coordinated CUI a smart phone, a pager, a PDA, networked computers and IVR and a car embedded computer that are conversationally connected. These CUI concepts will be explained in greater detail below.

The CVM system further comprises a plurality of applications including conversationally aware applications 11 (i.e., applications that "speak" conversational protocols) and conventional applications 12. The conversationally aware applications 11 are applications that are specifically programmed for operating with a CVM core layer (or kernel) 14 via conversational application APIs 13. In general, the CVM kernel 14 controls the dialog across applications and devices on the basis of their registered conversational capabilities and requirements and provides a unified conversational user interface which goes far beyond adding speech as I/O modality to provide conversational system behaviors. The CVM system may be built on top of a conventional OS and APIs 15 and conventional device hardware 16 and located on a server or any client device (PC, PDA, PvC). The conventional applications 12 are managed by the CVM kernel layer 14 which is responsible for accessing, via the OS APIs, GUI menus and commands of the conventional applications as well as the underlying OS commands. The CVM automatically handles all the input/output issues, including the conversational subsystems 18 (i.e., conversational engines) and conventional subsystems (e.g., file system and conventional drivers) of the conventional OS 15. In general, conversational sub-systems 18 are responsible for converting voice requests into queries and converting outputs and results into spoken messages using the appropriate data files 17 (e.g., contexts, finite state grammars, vocabularies, language models, symbolic query maps etc.) The conversational application API 13 conveys all the information for the CVM 14 to transform queries into application calls and conversely converts output into speech, appropriately sorted before being provided to the user.

Figure 2:
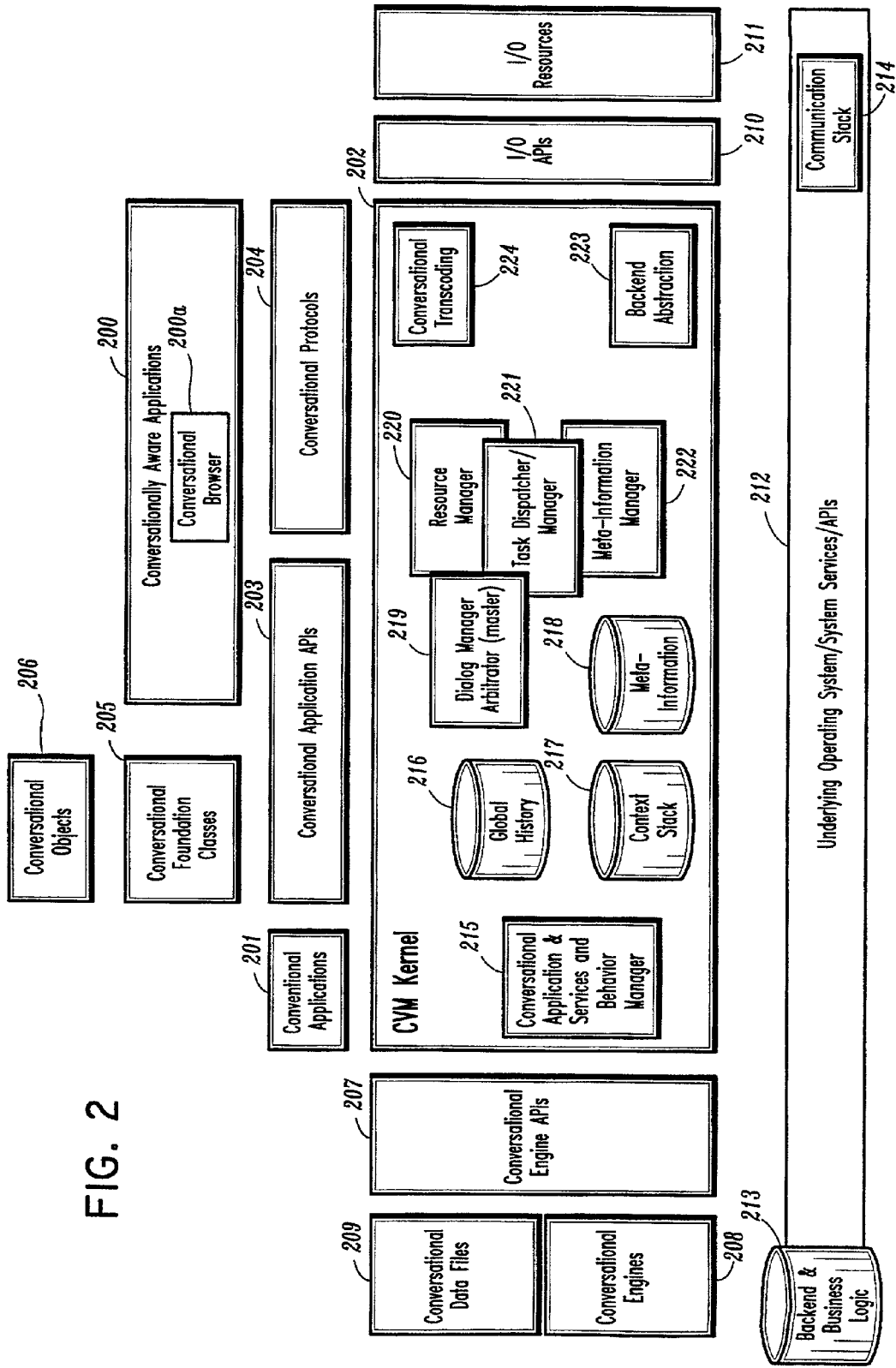
FIG. 2 is a diagram illustrating abstract layers of a conversational computing system according to an embodiment of the present invention.

Referring now to FIG. 2, a diagram illustrates abstract programming layers of a conversational computing system (or CVM) according to an embodiment of the present invention. The abstract layers of the CVM comprise conversationally aware applications 200 and conventional applications 201. As discussed above, the conversationally aware applications 200 interact with a CVM kernel layer 202 via a conversational application API layer 203. The conversational application API layer 203 encompasses conversational programming languages/scripts and libraries (conversational foundation classes) to provide the various features (discussed below) offered the CVM kernel 202. For example, the conversational programming languages/scripts provide the conversational APIs that allow an application developer to hook (or develop) conversationally aware applications 200. They also provide the conversational API layer 203, conversational protocols 204 and system calls that allows a developer to build the conversational features into an application to make it "conversationally aware." The code implementing the applications, API calls and protocol calls includes interpreted and compiled scripts and programs, with library links, conversational logic (as described below) engine call and conversational foundation classes.

More specifically, the conversational application API layer 203 comprises a plurality of conversational foundation classes 205 (or fundamental dialog components) which are provided to the application developer through library functions that may be used to build a CUI or conversationally aware applications 200 according to the present invention. The conversational foundation classes 205 are the elementary components or conversational gestures (as described by T. V. Raman, in "Auditory User Interfaces, Toward The Speaking Computer," Kluwer Academic Publishers, Boston 1997) that characterize any dialog, independently of the modality or combination of modalities (which can be implemented procedurally or declaratively). The conversational foundation classes 205 comprise CUI building blocks and conversational platform libraries, dialog modules and components, and dialog scripts and beans. The conversational foundation classes 205 may be compiled locally into conversational objects 206.

More specifically, the conversational objects 205 (or dialog components) are compiled from the conversational foundation classes 205 (fundamental dialog components) by combining the different individual classes in a code calling these libraries through a programming language such as Java or C++. As noted above, coding comprises embedding such fundamental dialog components into declarative code or liking them to procedural code. Nesting and embedding of the conversational foundation classes 205 allows the conversational object 206 (either reusable or not) to be constructed (either declaratively or via compilation/interpretation) for performing specific dialog tasks or applications. For example, the conversational objects 206 may be implemented declaratively such as pages of CML (conversational markup language) (nested or not) which are processed or loaded by a conversational browser (or viewer) (200*a*) as disclosed in the patent application Ser. No. 09/806,544, filed concurrently herewith, entitled "Conversational Browser and Conversational Systems", which is commonly assigned and incorporated herein by reference. The dialog objects comprise applets or objects that may be loaded through CML (conversational markup language) pages (via a conversational browser), procedural objects on top of CVM (possible distributed on top of CVM), script tags in CML, and servlet components.

Some example of conversational gestures that may be implemented in accordance with the present invention are as follows. A conversational gesture message is used by a machine to convey informational messages to the user. The gesture messages will typically be rendered as a displayed string or spoken prompt. Portions of the message to be spoken can be a function of the current state of the various applications/dialogs running on top of the CVM. A conversational gesture "select from set" is used to encapsulate dialogues where the user is expected to pick from a set of discrete choices. It encapsulates the prompt, the default selection, as well as the set of legal choices. Conversational gesture message "select from range" encapsulates dialogs where the user is allowed to pick a value from a continuous range of values. The gesture encapsulates the valid range, the current selection, and an informational prompt. In addition, conversational gesture input is used to obtain user input when the input constraints are more complex (or perhaps non-existent). The gesture encapsulates the user prompt, application-level semantics about the item of information being requested (TBD) and possibly a predicate to test the validity of the input. As described above, however, the conversational foundation classes include, yet surpass, the concept of conversational gestures (i.e., they extend to the level of fundamental behavior and services as well as rules to perform conversational tasks).

As discussed below, a programming model allows the connection between a master dialog manager and engines through conversational APIs. Data files of the foundation classes are present on CVM (loadable for embedded platforms). Data files of objects can be expanded and loaded. Different objects act as simultaneous dialog managers. Examples of some conversational foundation classes are as follows:

Low-Level Dialog Conversational Foundation Classes:

(multi-modal feature available where appropriate)

(with CVM handle when distributed)

1. Select_an_item_from_list
2. Field_filing_with_grammar
3. Acoustic_Enroll_speaker_
4. Acoustic_Identify_speaker
5. Acoustic_Verify_speaker
6. Verify_utterance
7. Add_to_list
8. Enroll_utterance
9. Get_input_from_NL
10. Disambiguate etc Low-Level Specialized Dialog Conversational Foundation Classes (multi-modal feature available where appropriate)

(with CVM handle when distributed)

1. Get_Yes/No
2. Get_a_date
3. Get_a_time
4. Get_a_natural_number
5. Get_a_currency
6. Get_a_telephone_number US or international, rules can be specified or any possibility
7. Get_digitstring
8. Get_alphanumeric
9. Get_spelling
10. Speech_biometrics_identify
11. Open_NL
12. Close_NL
13. Delete_NL
14. Save_NL
15. Select_NL
16. Mark_NL etc.

Intermediate-Level Dialog Conversational Foundation Classes (multi-modal feature available where appropriate)

(with CVM handle when distributed)

1. Form_filling
2. Request_confirmation
3. Identify user by dialog
4. Enrol_user by dialog
5. Speech_biometrics_identify
6. Verify_user by dialog
7. Correct_input
8. Speech_biometrics_identify
9. Speech_biometrics_verify
10. Speech_biometrics_enrol
11. Manage_table
12. Fill_free_field
13. Listen_to_TTS
14. Listen_to_playback
15. Simulltaneous_form_filling
16. Simultaneous_classes_dialog
17. Summarize_dialog etc.

High-Level Application Specific Foundation Classes (multi-modal feature available where appropriate)

(with CVM handle when distributed)

1. Manage_bank_account
2. Manage_portfolio
3. Request_travel_reservation
4. Manage_e-mail
5. Manage_calendar
6. Manage_addressbook/director etc.

Communication Conversational Classes

1. Get_list_of_CVM_devices
2. Get_capability_of_CVM_device
3. Send_capability_to_CVM_device
4. Request_device_with_given_capability 5. Get_handle_from_CVM_device 6. Mark_as_Master_CVM 7. Mark_as_active_CVM 8. Get_context 9. Send_context 10. Get_result 11. Send_result 12. Save_on_context etc.

Services and Behavior Conversational Foundation Classes (again it can be with CVM handle when distributed)

1. Get_meta-information

2. Set_meta-information

3. Register_category

4. Get_list_of_categories

5. Conversational_search (dialog or abstraction-based)

6. Conversational_selection (dialog or abstraction-based)

7. Accept_result

8. Reject_result

9. Arbitrate_result etc.

Other Services (with multiple classes)

Conversational security

Conversational customization

Conversational Help

Conversation prioritization

Resource management

Output formatting and presentation

I/O abstraction

Engine abstractions

Etc.

Rules

How complete get a name from a first name

How to get a phone number

How to get an address

How to undo a query

How to correct a query etc.

The development environment offered by the CVM is referred to herein as SPOKEN AGE™. Spoken Age allows a developer to build, simulate and debug conversational aware application for CVM. Besides offering direct implementation of the API calls, it offers also tools to build advanced conversational interfaces with multiple personalities, Voice fonts which allows the user to select the type of voice providing the output and conversational formatting languages which builds conversational presentations like Postcript and AFL (audio formatting languages).

As described above, the conversational application API layer 203 encompasses conversational programming languages and scripts to provide universal conversational input and output, conversational logic and conversational meta-information exchange protocols. The conversational programming language/scripts allow to use any available resources as input or output stream. As explained in greater detail below, using the conversational engines 208 and conversational data files 209 (accessed by CVM 202 via conversation engine APIs 207), each input is converted into a binary or ASCII input, which can be directly processed by the programming language as built-in objects. Calls, flags and tags can be automatically included to transmit between object and processes the conversational meta-information required to correctly interface with the different objects. Moreover, output streams can be specially formatted according to the needs of the application or user. These programming tools allow multi-modal discourse processing to be readily built. Moreover, logic statement status and operators are expanded to handle the richness of conversational queries that can be compared on the bases of their ASCII/binary content or on the basis of their NLU-converted query (input/output of conventional and conversational sub-systems) or FSG-based queries (where the system used restricted commands). Logic operators can be implemented to test or modify such systems. Conversational logic values/operators expand to include: true, false, incomplete, ambiguous, different/equivalent for an ASCII point of view, different/equivalent from a NLU point of view different/equivalent from a active query field point of view, unknown, incompatible, and incomparable.

Further more, the conversational application API layer 203 comprises code for providing extensions of the underlying OS features and behavior. Such extensions include, for example, high level of abstraction and abstract categories associated with any object, self-registration mechanisms of abstract categories, memorization, summarization, conversational search, selection, redirection, user customization, train ability, help, multi-user and security capabilities, as well as the foundation class libraries, each of which is discussed in greater detail below.

The conversational computing system of FIG. 2 further comprises a conversational engine API layer 207 which provides an interface between core engines conversational engines 208 (e.g., speech recognition, NL parsing, NLU, TTS and speech compression/decompression engines) and the applications using them. The engine API layer 207 also provides the protocols to communicate with core engines whether they be local or remote. An I/O API layer 210 provides an interface with conventional I/O resources 211 such as a keyboard, mouse, touch screen, keypad, etc. (for providing a multi-modal conversational UI) and an audio subsystem for capturing speech I/O (audio in/audio out). The I/O API layer 210 provides device abstractions, I/O abstractions and UI abstractions. The I/O resources 211 will register with the CVM kernel layer 202 via the I/O API layer 210.

The core CVM kernel layer 202 comprises programming layers such as a conversational application & behavior/service manager layer 215, a conversational dialog manager (arbitrator) layer 219, a conversational resource manager layer 220, a task/dispatcher manager 221 and a meta information manager 220, which provide the core functions of the CVM layer 202. The conversational application and behavior/service manager layer 215 comprises functions for managing the conventional and conversationally aware applications 200 and 201. Such management functions include, for example, keeping track of which applications are registered (both local and network-distributed), what are the dialog interfaces (if any) of the applications, and what is the state of each application. In addition, the conversational application and services/behavior manager 20 initiates all the tasks associated with any specific service or behavior provided by the CVM system. The conversational services and behaviors are all the behaviors and features of a conversational UI that the user may expect to find in the applications and interactions, as well as the features that an application developer may expect to be able to access via APIs (without having to implement with the development of the application). Examples of the conversational services and behavior provided by the CVM kernel 202 include, but are not limited to, conversational categorization and meta-information, conversational object, resource and file management, conversational search, conversational selection, conversational customization, conversational security, conversational help, conversational prioritization, conversational resource management, output formatting and presentation, summarization, conversational delayed actions/agents/memorization, conversational logic, and coordinated interfaces and devices (each of which is explained in detail herein). Such services are provided through API calls via the conversational application API Layer 203. The conversational application and behavior/services manager 215 is responsible for executing all the different functions needed to adapt the UI to the capabilities and constraints of the device, application and/or user preferences.

The conversational dialog manager 219 comprises functions for managing the dialog (conversational dialog comprising speech and multi modal I/O such as GUI keyboard, pointer, mouse, video input etc) across all registered applications. In particular, the conversational dialog manager 219 determines what information the user has, which inputs the user presents, and which application(s) should handle the user inputs.

The conversational resource manager 220 determines what conversational engines 208 are registered (either local conversational 208 and/or network-distributed resources), the capabilities of each registered resource, and the state of each registered resource. In addition, the conversational resource manager 220 prioritizes the allocation of CPU cycles or input/output priorities to maintain a flowing dialog with the active application (e.g., the engines engaged for recognizing or processing a current input or output have priorities). Similarly, for distributed applications, it routes and selects the engine and network path to be used to minimize any network delay for the active foreground process.

The task dispatcher/manager 221 dispatches and coordinates different tasks and processes that are spawned (by the user and machine) on local and networked conventional and conversational resources (explained in further detail below). The meta information manager 222 manages the meta-information associated with the system via a meta-information repository 218. The meta information manager 218 and repository 218 collect all the information typically assumed known in a conversational interaction but not available at the level of the current conversation. Examples are: a-priori knowledge: cultural, educational assumptions and persistent information: past request, references, information about the user, the application, news, etc. It is typically the information that needs to be preserved and persist beyond the length/life of the conversational history/context and the information that is expected to be common knowledge for the conversation and therefore, has never been defined during the current and possible past conversational interactions. Also, as described below, shortcuts to commands, resources and macros, etc. are managed by the meta-information manager 222 and stored in the meta information repository 218. In addition, the meta-information repository 21 includes a user-usage log based on user identity. It is to be appreciated that services such as conversational help and assistance, as well as some dialog prompts (introduction, questions, feedback etc) provided by the CVM system can be tailored based on the usage history of the user as stored in the meta-information repository 218 and associated with the application. If a user has been previously interacting with a given application, an explanation can be reduced assuming that it is familiar to the user. Similarly, if a user commits many errors, the explanations can be more complex, as multiple errors is interpreted as user uncertainty, unfamiliarity, or incomprehension/misunderstanding of the application or function.

A context stack 217 is managed by the dialog manager 219. The context stack 217 comprises all the information associated with an application. Such information includes all the variable, states, input, output and queries to the backend that are performed in the context of the dialog and any extraneous event that occurs during the dialog. As explained in further detail below, the context stack is associated with the organized/sorted context corresponding to each active dialog (or deferred dialog-agents/memorization). A global history 216 is included in the CVM system includes information that is stored beyond the context of each application. The global history stores, for example, the information that is associated with all the applications and actions taking during a conversational session (i.e., the history of the dialog between user and machine for a current session (or from when the machine was activated).

The CVM kernel layer 202 further comprises a backend abstraction layer 223 which allows access to backend business logic 213 via the dialog manager 219 (rather than bypassing the dialog manager 219). This allows such accesses to be added to the context stack 217 and global history 216. For instance, the backend abstraction layer 223 can translate input and output to and from the dialog manager 219 to database queries. This layer 223 will convert standardized attribute value n-uples into database queries and translate the result of such queries into tables or sets of attribute value n-uples back to the dialog manager 219. In addition, a conversational transcoding layer 224 is provided to adapt the behavior, UI and dialog presented to the user based on the I/O and engine capabilities of the device which executes the CVM system.

The CVM system further comprises a communication stack 214 (or communication engines) as part of the underlying system services provided by the OS 212. The CVM system utilizes the communication stack to transmit information via conversational protocols 204 which extend the conventional communication services to provide conversational communication. It is to be understood that the communication stack 214 may be implemented in connection with the well-known OSI (open system interconnection) protocol layers according to one embodiment of the present invention for providing conversational communication exchange between conversational devices. As is known in the art, OSI comprises seven layers with each layer performing a respective function to provide communication between network distributed conversational applications of network-connected devices. Such layers (whose functions are well-understood) comprise an application layer, a presentation layer, a session layer, a transport layer, a network layer, a data link layer and a physical layer. The application layer is extended to allow conversational communication via the conversational protocols 204.

Figure 3:
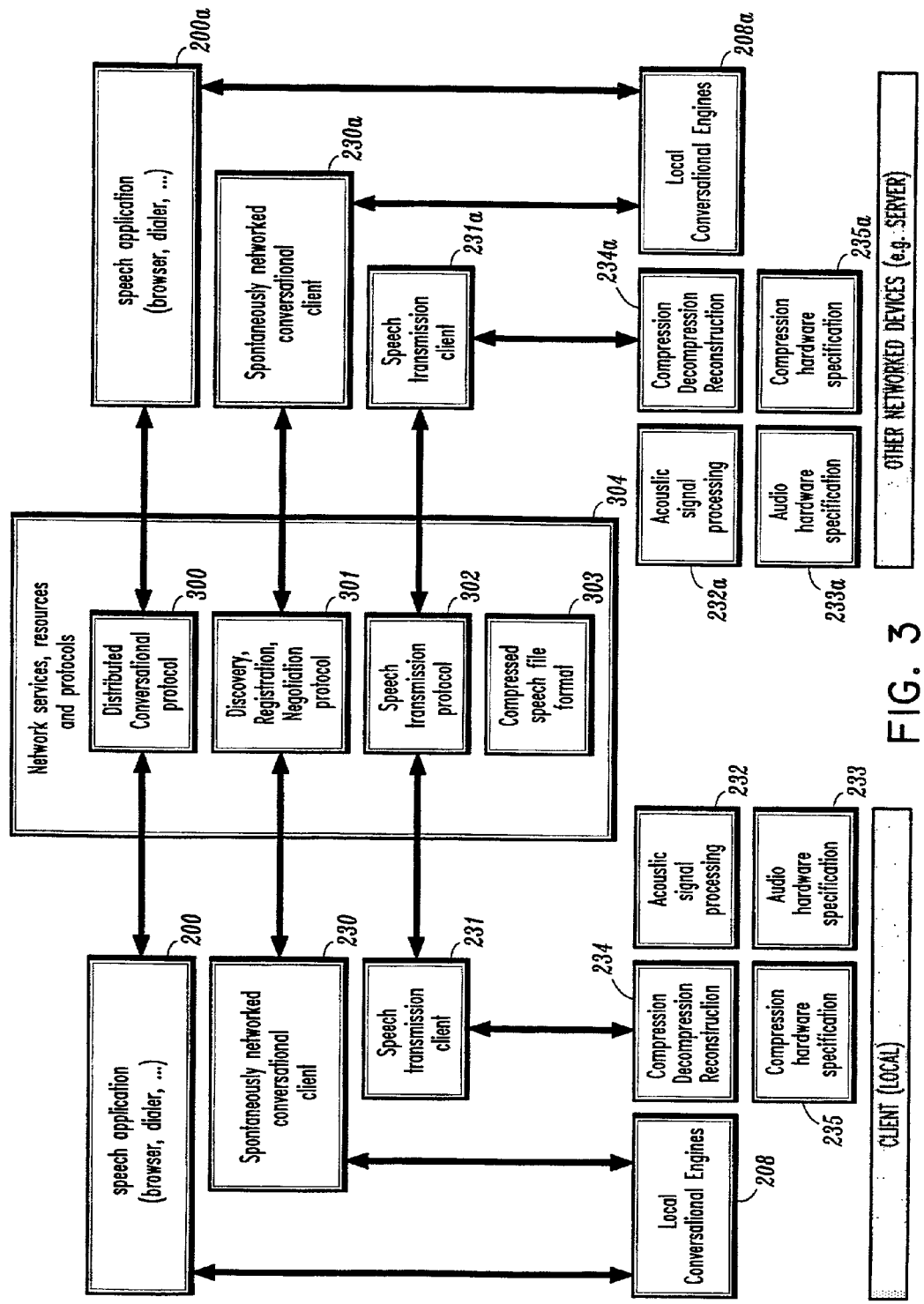
FIG. 3 is a block diagram illustrating conversational protocols that are implemented in a conversational computing system according to one aspect of the present invention.

The conversational protocols 204 allow, in general, remote applications and resources register their conversational capabilities and proxies. These conversational protocols 204 are further disclosed in the patent application Ser. No. 09/806,425, filed concurrently herewith, entitled "System and Method For Providing Network Coordinated Conversational Services," which is commonly assigned and incorporated herein by reference (wherein the conversational protocols are utilized in a system that does not utilize a CVM system). In particular, referring additionally to FIG. 3, the conversational protocols 204 (or methods) include distributed conversational protocols 300, discovery, registration, and negotiation protocols 301 and speech transmission protocols 302. The distributed conversational protocols 300 allow network conversational applications 200, 200a and network-connected devices (local client and other networked devices such as a server) to exchange information register their current conversational state, arguments (data files 209) and context with each other. The distributed conversational protocols 300 allow the sharing of local and distributed conversational engines 208, 208a between network connected devices (e.g., client/server). The distributed conversational protocols 300 also include Dialog Manager (DM) protocols (discussed below). The distributed conversational protocols allow the exchange of information to coordinate the conversation involving multiple devices or applications including master/salve conversational network, peer conversational network, silent partners. The information that may be exchanged between networked devices using the distributed conversational protocols comprise, pointer to data files (arguments), transfer (if needed) of data files and other conversational arguments, notification for input, output events and recognition results, conversational engine API calls and results, notification of state and context changes and other system events, registration updates: handshake for registration, negotiation updates: handshake for negotiation, and discovery updates when a requested resources is lost.

In addition, the distributed conversational protocols 300 also allow the applications and devices to exchange other information such as applets, ActiveX components, and other executable code that allows the devices or associated applications to coordinate a conversation between such devices in, e.g., a master/slave or peer-to-peer conversational network configuration and networks comprising silent partners. In other words, when multiple CVM or conversationally aware multiple devices are conversationally connected and coordinated, it becomes possible to simultaneously control them through one single interface (i.e. through a single microphone). For example, voice can automatically control through a unique coordinated conversational interface a smart phone, a pager, a PDA, networked computers, a IVR and a car embedded computer. Silent partners can be controlled via conversational interface from another conversational device. Silent partners is a system that is conversationally aware such that it can interact with a network connected CVM via APIs/protocols. A silent partner, however, does not present any I/O to the user other than possibly the functions for which it has been designated. For example, a lamp in a room can be conversationally aware by being discoverable by a CVM, being able to register its conversational state (e.g., what its commands are: switch lamp on, switch lamp off) and being able to execute commands transmitted from a CVM. Under this form, a CVM remote control referred to herein as a UCRC (universal conversational remote control) is able to download the commands supported by all the discovered conversationally aware appliances. The user can then control these applications by voice simply by dialoging with the CVM remote control.

In one embodiment, the distributed conversational protocols 300 are implement via RMI (remote method invocation) or RPC (remote procedure call) system calls to implement the calls between the applications and the different conversational engines over the network. As is known in the art, RPC is a protocol that allows one application to request a service from another application across the network. Similarly, RMI is a method by which objects can interact in a distributed network. RMI allows one or more objects to be passed along with the request.

The conversational protocols 204 further comprise conversational discovery (detection), registration, and negotiation protocols (or methods) 301. The registration protocols allow each networked device or application to exchange and register information regarding their conversational capabilities, state/context and arguments, so as to limit data transfer between the devices to relevant information and negotiate the master/slave or peer networking. Silent conversational partners (which are only conversationally aware) behave similarly (i.e., register their capabilities etc.) and can interact through a conversational proxy server or as conversational client of a CVM (i.e., silent partners use conversational registration with the CVM devices).

The registration protocols allow the following information to be exchanged: (1) capabilities and load messages including definition and update events; (2) engine resources (whether a given device includes NLU, DM, NLG, TTS, speaker recognition, speech recognition compression, coding, storage, etc.); (3) I/O capabilities; (4) CPU, memory, and load capabilities; (5) data file types (domain specific, dictionary, language models, languages, etc.); (6) network addresses and features; (7) information about a user (definition and update events); (8) user preferences for the device, application or dialog; (9) customization; (10) user experience; (11) help; (12) capability requirements per application (and application state) (definition and update events); (13) meta information for CUI services and behaviors (help files, categories, conversational priorities, etc.) (definition and update events, typically via pointer to table); (14) protocol handshakes; and/or (15) topology negotiation.

Registration may be performed using a traditional communication protocol such as TCP/IP, TCP/IP 29, X-10 or CEBus, and socket communication between devices. The devices use a distributed conversational architecture to communicate to their associated conversational engine and a CVM controller, their conversational arguments (e.g., active vocabulary, grammars and language models, parsing and translation/tagging models, voice prints, synthesis rules, baseforms (pronunciation rules) and voice fonts). This information is either passed as files or streams to the CVM controller and the conversational engines, or as URLs (or as noted above, declarative or procedural at the level of information exchange between devices: objects and XML structures). In one embodiment for implementing the registration protocols, upon connection, the devices can exchange information about their conversational capabilities with a prearranged protocol (e.g., TTS English, any text, Speech recognition, 500 words and FSG grammar, no speaker recognition, etc.) by exchanging a set of flags or a device property object. Likewise, applications can exchange engine requirement lists. With a master/slave network configuration, the master dialog manager can compile all the lists and match the functions and needs with conversational capabilities. In addition, context information may be transmitted by indicating passing or pointing to the context stack/history of the device or application that the controller can access and add to its context stack. Devices also pass information about their multi-modal I/O and UI capabilities (screen/no screen, audio in and out capabilities, keyboard, etc.) The conversational arguments allow a dialog engine to estimate the relevance of a new query by the NLU engine, based on the current state and context.

The conversational discovery protocols 301 are utilized by spontaneously networked conversational clients 230, 230*a* of the devices to automatically discover local or network conversationally aware systems and dynamically and spontaneously network-connect such conversationally aware systems. The information that is exchanged via the discovery protocols comprises the following: (1) broadcast requests for handshake or listening for requests; (2) exchange of device identifiers; (3) exchange of handles/pointer for first registration; and (4) exchange of handles for first negotiation Furthermore, the negotiation protocols 301 allow the negotiation between master/slave or peer networking so as to provide the appropriate coordination between multiple CVM systems in dynamic master-slave and peer-to-peer interactions. More specifically, multiple CVM devices when registering will add to the conversational registration capability, information pertaining to, e.g., their controlling capability, the conversational engines that they have access to, and applications and devices that have registered with them and that they control. Based on their UI, I/O capabilities and active I/O, one CVM controller becomes the master and the other CVM controllers act as slaves, which is equivalent relatively to the master as being registered applications until a new negotiation occurs. The role of master and slave can be dynamically switched based on the active I/O modality or device or based on the active application.

The speech transmission protocols 302 (or conversational coding protocols) are used by speech transmission clients 38, 38*a* to transmit/received compressed speech to/from other networked devices, systems or applications for processing. The speech transmission clients 38, 38*a* operates in conjunction with compression, decompression and reconstruction engines 234, 234*a* using suitable compression hardware 235, 235*a* for processing the speech transmitted over the network. The speech coders 234, 234*a* provide perceptually acceptable or intelligible reconstruction of the compressed speech and optimized conversational performance (e.g., word error rate). The speech is captured (and transformed into features) on the respective networked devices using acoustic signal processing engines (audio subsystems) 232, 232*a* and suitable audio hardware 233, 233*a*. In addition, compressed speech file formats 303 can be transmitted and received between devices for processing speech. More specifically, the speech transmission protocols 303 allow the devices to transmit and receive compressed speech or local processing results to/from other devices and applications on the network. As noted above, the conversational engines 208 (FIG. 2) preferably include compression/decompression engines 234 for compressing speech (or results) for transmission and decompressing compressed speech (or results) obtained over the network from another device or application for local processing. In one embodiment, after the handshake process between a transmitting device and a receiving device, a data stream (packet based) is sent to the receiver. The packet headers preferably specify the coding scheme and coding arguments (i.e. sampling frequency, feature characteristics, vector dimensions, feature transformation/family etc. as discussed in the above incorporated patent application Ser. No. 09/806,425) using for encoding the speech (or results). In addition, error correcting information can also be introduced (e.g. last feature vector of the previous packet to correct he differential decoders if the previous packet is lost or delayed), or appropriate messaging to recover (re-send) lost packets.

Figure 9:
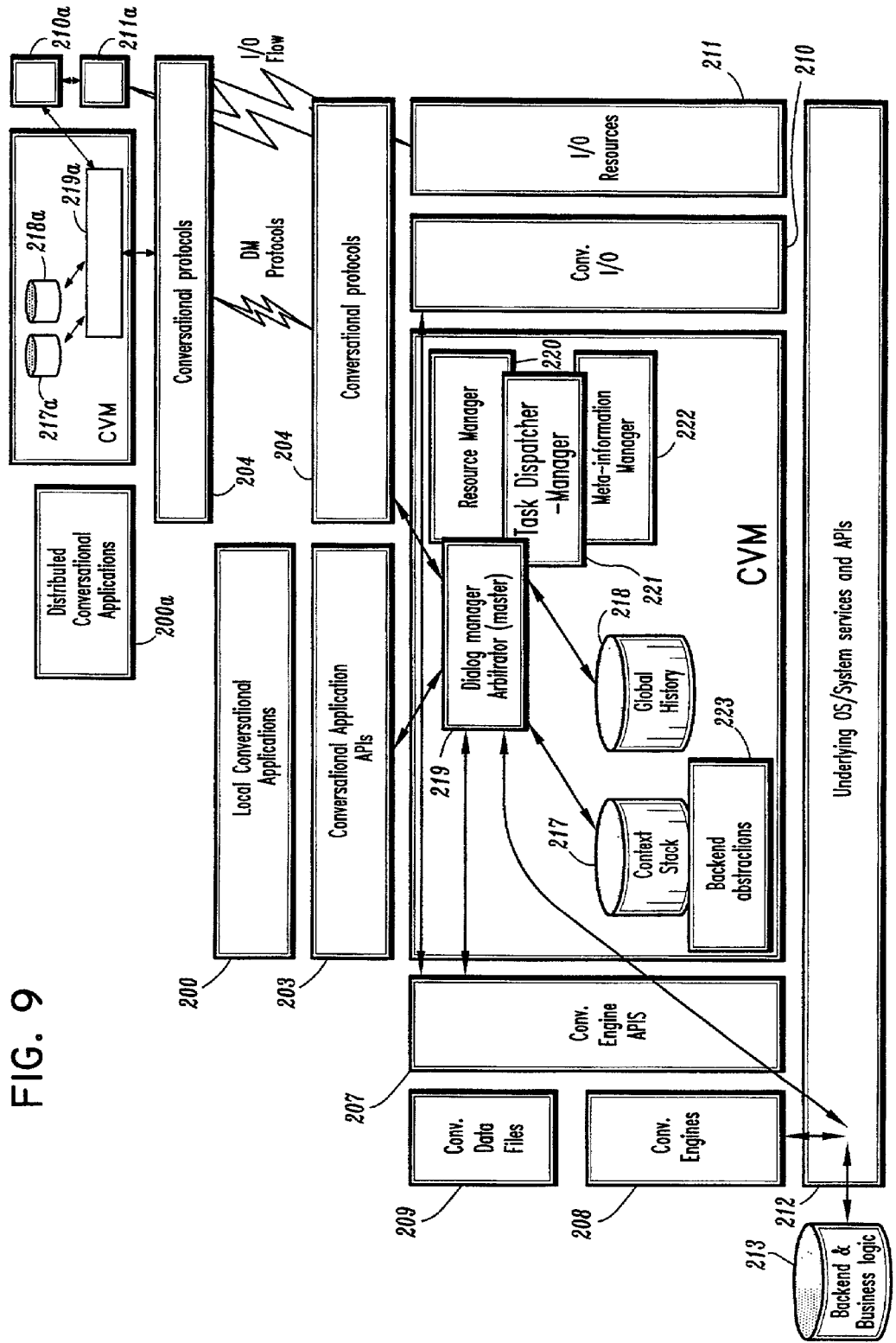
FIG. 9 is a diagram illustrating a dialog management process according to one aspect of the present invention.
Figure 10:
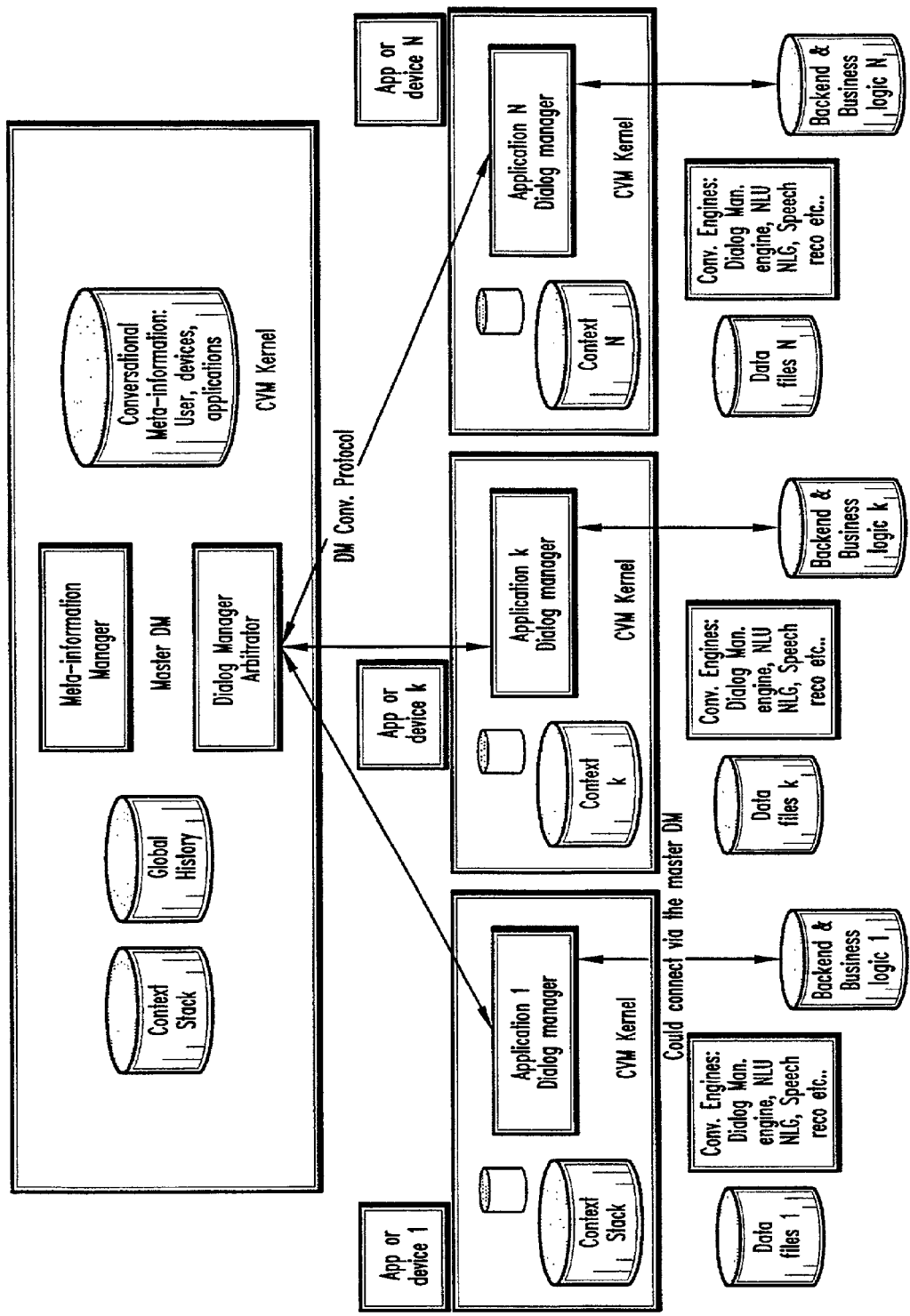
FIG. 10 is a diagram of a dialog management process according to another aspect of the present invention.
Figure 11:
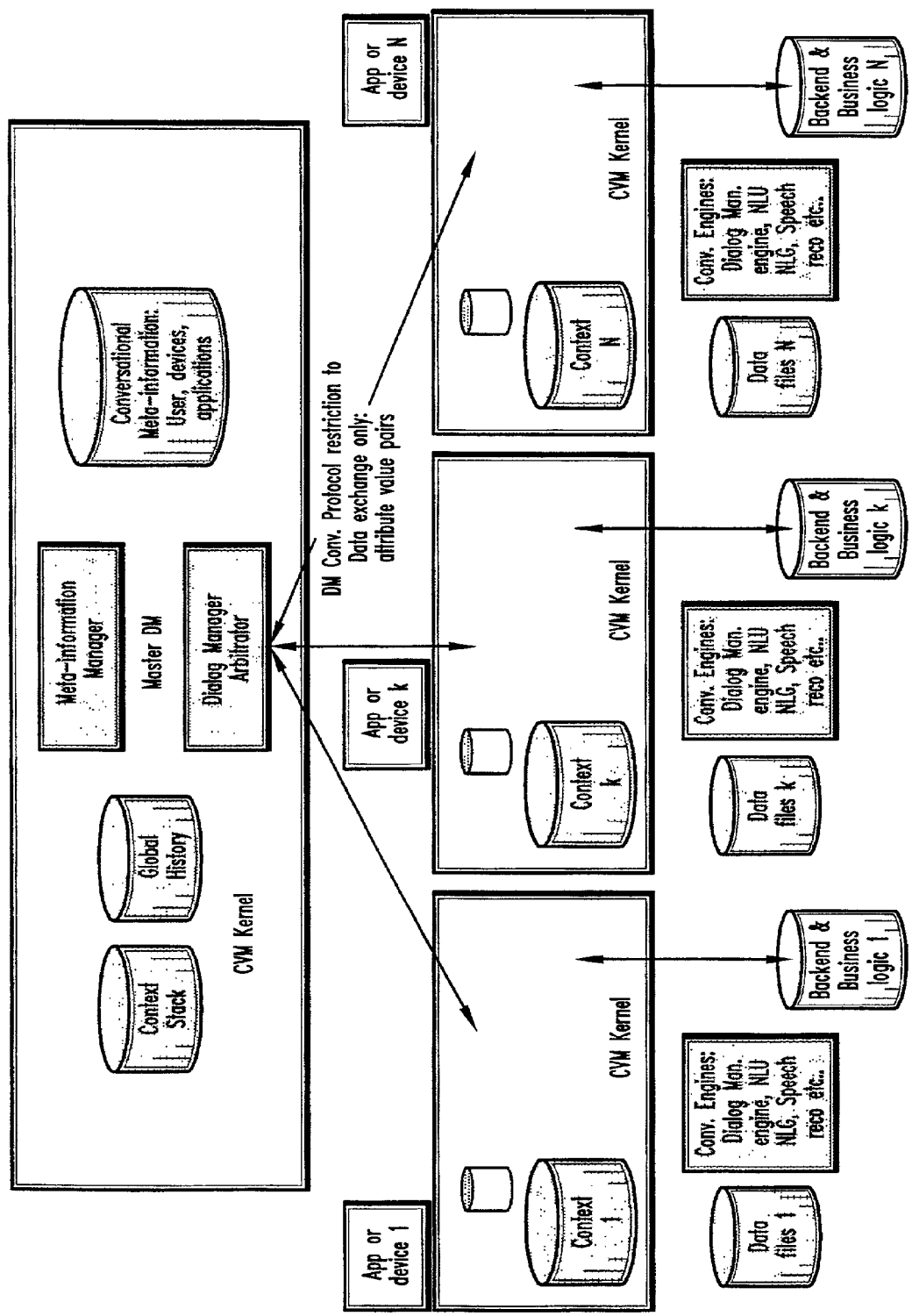
FIG. 11 is a diagram of a dialog management process according to another aspect of the present invention.

As illustrated in FIGS. 9, 10 and 11, the conversational protocols 204 further include protocols for information exchange between dialog managers (DMs) (DMs are discussed in detail below) of networked devices. As shown in FIG. 9, for example, in a distributed application (distributed applications 200*a*), dialog management protocols are used for exchanging information to determine which dialog manager (219 or 219*a*) will execute a given function. Typically, different devices, CVMs or different applications will have their own dialog manager, context stack 217, 217*a* and global history 218, 218*a*. Through the dialog manager DM protocols (which are part of the distributed protocols 300 (FIG. 3), the different dialog managers will negotiate a topology with a master dialog manager and slave or peer dialog managers. The active master dialog manager (illustrated as dialog manger 219 in FIG. 9) will be responsible for managing the flow of I/O to the different managers to decide the active dialog and appropriately execute a query and update the context and history. For instance, the following information can be exchanged: (1) DM architecture registration (e.g., each DM can be a collection of locals DMs); (2) pointers to associated meta-information (user, device capabilities, application needs, etc.); (3) negotiation of DM network topology (e.g., master/slave, peer-to-peer); (4) data files (conversational arguments) if applicable i.e., if engines are used that are controlled by a master DM); (5) notification of I/O events such as user input, outputs to users for transfer to engines and/or addition to contexts; (6) notification of recognition events; (7) transfer of processed input from engines to a master DM; (8) transfer of responsibility of master DM to registered DMs; (9) DM processing result events; (10) DM exceptions; (11) transfer of confidence and ambiguity results, proposed feedback and output, proposed expectation state, proposed action, proposed context changes, proposed new dialog state; (12) decision notification, context update, action update, state update, etc; (13) notification of completed, failed or interrupted action; (14) notification of context changes; and/or (15) data files, context and state updates due to action. In addition, actions, I/O events, backend accesses are information that is shared with the conversational resource manager and task dispatcher manager.

FIGS. 10 and 11 illustrate a system and method for dialog management according to the present invention. More specifically, FIG. 10 illustrates a hierarchical dialog between multiple dialog managers (i.e, the master arbitrator, and the slave dialog managers 1, k, and N) of various devices/applications (1, k and N). FIG. 10 illustrates a typical master slave topology. As discussed above, the topology is formed by exchanging the relevant information via the DM protocols. On the other hand, FIG. 11 illustrates another master/slave configuration where only the main root (arbitrator) dialog manager performs the dialog manager task for one or more applications or devices (1, k, N). In this instance, the master dialog manager arbitrator is the only dialog manager present and maintains the global context and history (possibly with classification of the application specific context and history). The DM protocol involves exchanging the attribute value n-uples between each application and device and the core root dialog manager.

It is to be appreciated that even when multiple devices/ applications are involved, the actual dialog managing process as illustrated in FIG. 10 can be performed in serial with one single dialog manager on a single device. The difference between the two situations is that the user has the feeling of carrying a conversation with an entity carrying multiple tasks, as opposed to carrying multiple conversations with one conversation per entity specialized for the given task. Each of these topologies can be negotiated via DM protocols or imposed by user preferences, application choice or CVM default settings.

Figure 4:
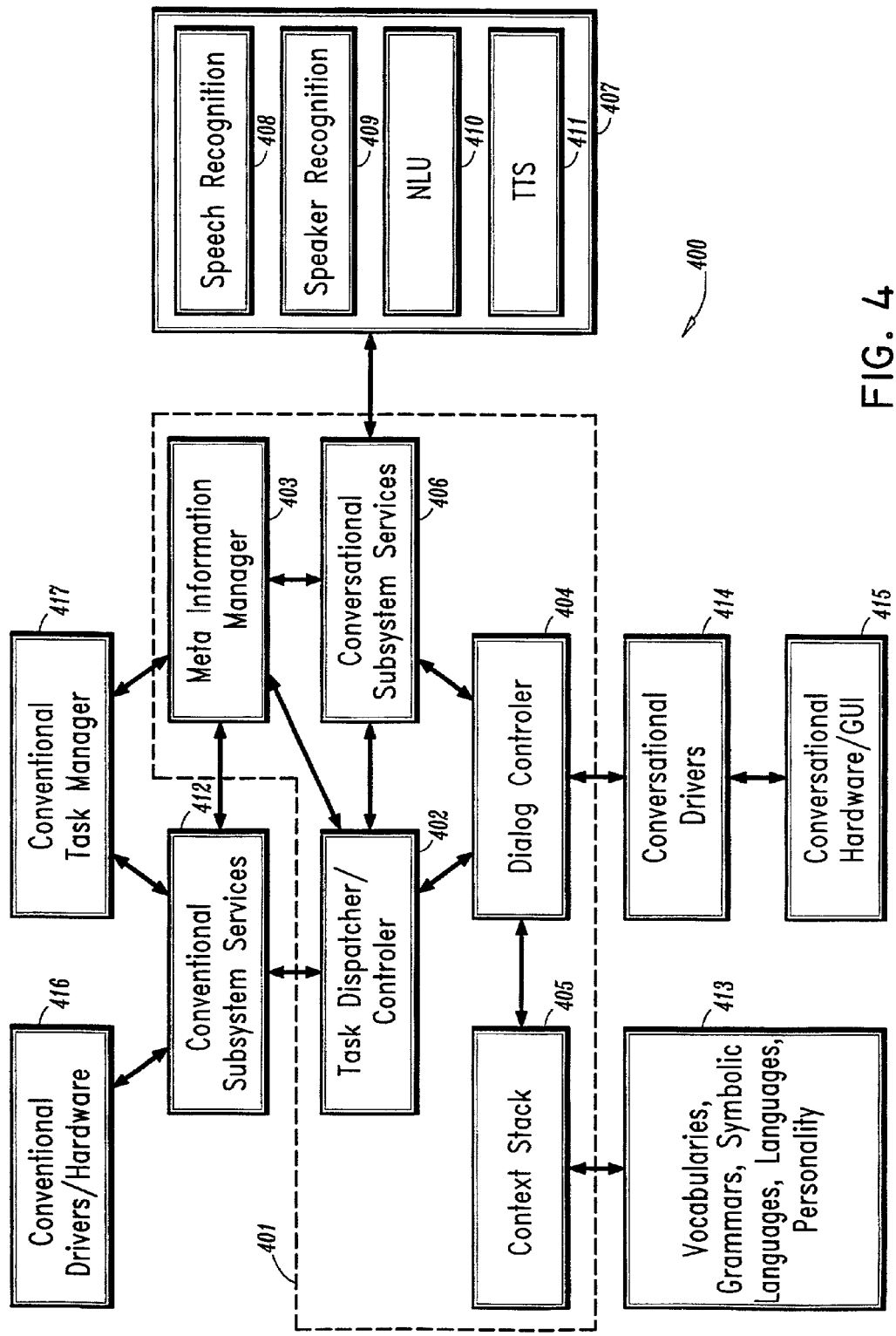
FIG. 4 is a block diagram of components of a conversational computing system according to an embodiment of the present invention.

Referring now to FIG. 4, a diagram illustrates a detailed architecture of a conversational system and the core functional modules of the conversational kernel of the CVM system according to one embodiment of the present invention. It is to be understood that the system of FIG. 4 and the accompanying description are for purposes of illustration to provide implementation examples and that one of ordinary skill in the art can envision other components or system architectures for implementing a CVM according to the spirit of the present invention. Furthermore, it is to be appreciated that each of these elements can be introduced in stand-alone mode within an application or as platform under an existing operating system, or a true CVM with a core kernel built around these different new elements. Conventional calls to the underlying operating system could be captured and implemented with CVM, which allows portability. In this instance, CVM is configured as a stand-alone platform for existing platforms.

Referring to FIG. 4, a conversational system 400 according to an embodiment of the present invention, in general, comprises a combination of conventional subsystems and conversational subsystems which are executed and managed by a CVM 401. The CVM 401 comprises a task dispatcher/ controller 402, a meta information manager 403, a dialog controller 404 (or dialog manager as referred to above), a context stack 405, and a conversational subsystem services manager 406. It is to be understood that the term "CVM controller" may be used herein to refer collectively to the task dispatcher/controller 402 and the dialog controller 404. In general, the CVM 401 operates by converting conversational and conventional input streams into multiple actions and produces sorted output to a user through conversational and/or conventional output streams.

The conversational system 400 further comprises a plurality of conversational resource subsystems (engines) 407 including, for example, a speech recognition system 408, a speaker recognition system 409, a natural language understanding and natural language parsing system 410 and a text-to-speech synthesis (TTS) system 411. It is to be understood that the conversational resources 407 may also include other systems such as a NLG (natural language generation) engine and an audio subsystem. As explained above, each of these conversational subsystems 407 may be accessed through API calls to the CVM 401. The CVM 401 will locate the requested conversational subsystem 407 (via the conversational subsystem services manager 406), drive its execution and return appropriately the results. It is to be appreciated that these conversational subsystem 407 can be local or distributed over a network and that all conversational subsystem calls are hidden to the application (although the engine APIs are always available to the application if the developer wants a to implement a specific behavior of the engines 407).

The conversational subsystem services manager 406 manages all the services, UI and behavior (as described herein) that are offered by the CVM 401. The conventional subsystem services manager 412 manages all the services and UI offered by an underlying operating system (or conventional I/O system even in the absence of an underlying OS).

The core of the CVM 401 is the context stack 405 which operates and is managed under the control of the dialog controller 404 (it is to be understood that the context stack 405 id directly related to the global history and meta information repository discussed above). In general, the context stack 405 accumulates the context (i.e., full query arguments list of attribute value n-uples, and state/mode) of each active process with an activated discourse (i.e., conversational interaction associated with a given task/process/ thread) along with any data files 413 (or at least identifiers of such conversational arguments) for the different engines that may be needed for input understanding (e.g., files or arguments that the engines use for performing their respective tasks such as active FSG, topic, vocabulary, HMM (hidden markov models), voiceprints, language models or possible queries for a speech input). In other words, the term "context" refers to the state of each discourse (whether active or normative), which keeps track of the past history of the discourse, its current state, and the specific characteristics and full query arguments of the corresponding task (e.g, vocabulary file, language model, parsing, tags, voiceprint, TTS rules, grammar, NLU etc. of each active task/ process) along with any data needed for input understanding. It is to be appreciated that, in a distributed CVM (as explained below), the context stack (as well as other CVM components) may be directly associated with networked services (i.e., distributed over the network) (as described above with respect to the context and global history).

More specifically, each new task, process, or thread creates a new stack entry and is associated with a discourse. Each application may be associated with multiple discourses (e.g. the application management discourse and the application content navigation discourses). Each context associated with a given discourse comprises the latest requests made to the corresponding process/task/thread as well as the latest output. The context of a given discourse is also associated with, e.g., any active grammars, vocabularies and symbolic language which maps the actual query. Again, the latest information is stored in the history and context stacks. Past history and context and other information is managed by the meta information manager 403 and stored as part of the meta information.

The dialog controller 404 manages the context stack 405 by creating a new stack entry in the context stack 405 for each new task/process/thread that is spawned either local or remotely from a networked device (with task management being controlled by the task dispatcher/controller 402 as discussed below). Each active application can be associated with multiple discourses (e.g. the application management discourse and the application content navigation discourses). As explained above, each context associated with a given discourse comprises the latest requests made to the corresponding process/task/thread as well as the latest output. Furthermore, the context of a given discourse is associated with, e.g., any active grammars, vocabularies and symbolic language (attribute value n-uple) which maps the actual query. The context stack 405 is associated with the machine state stack so that for any new input from a user, the dialog controller 404 may traverse the context stack 405 until the input context can be appropriately established. This essentially amounts to finding and selecting the active discourse between the user and machine among the last and past discourses.

The task dispatcher/controller 402 dispatches and coordinates different tasks and processes that are spawned (by the user and machine) on local and networked conventional and conversational resources. The task dispatcher/controller 402 is essentially a resource allocation mechanism which, in general, dispatches the activated tasks (whether they are conventional or conversational tasks) and controls the status of each task, resource, etc. by monitoring the load and availability of all the resources and appropriately assign and shift the various tasks to different resources. The resource allocation function involves determining the current load of each resource, the needs of each service and application, and balancing/managing the overall system by dispatching tasks to the resources that can handle them to optimize the overall system load and conversational flow. The task dispatcher/controller 402 relies on conventional system management procedures (via the conventional task manager 417) plus any information exchanged by the different resources (via discovery, registration, negotiation, and distributed conversational protocols discussed above). The task dispatcher/controller 402 keeps track of these resources and shares the conventional subsystems (e.g., GUI I/O and system, video recognition engine, etc.) and conversational subsystems 407 between the different tasks on the context stack 405. In addition, the task dispatcher/controller 402 will utilize the service of the underlying operating system to manage and control conventional tasks that can be controlled by the operating system at the level of the conventional task manager 417. Again, as noted above, the conventional operating system can perform task management under the instruction of the conversational task dispatcher manager/controller 402.

The task dispatcher/controller 402 feeds input from the conventional and conversational subsystems services 412, 406 to the context stack 405 (via the dialog controller 404 which selects the active context) and feeds the output of the different tasks to the different subsystems and prioritizes them. The task dispatcher/controller 402 also inserts and manages conversational assistants in the form of agents/daemons and memorization tasks along the context stack 405. The task dispatcher/controller 402 coordinates the output generation and prioritization according to the active conversation and conversation history, delayed returns, delegation across network resources and task delegation, summarization, and memorization (which functions are explained below).

A dialog controller 404 manages the dialog (conversational=speech and multi-modal: GUI, keyboard, pointer, mouse, video input, etc.) across all the conversational and conventional applications (registered with the task dispatcher/controller 402). As explained above, applications exchange (via API call or negotiation protocols) information about their state, how they interpret a latest input, and the confidence level for such interpretation. The dialog controller 404 manages and determines the active context and application. It also manages the conversational protocols by which applications exchange information to assist the dialog controller 404 in determining which applications are active, or activates a small dialog to resolve ambiguity if it can't make such determination.

Figure 5:
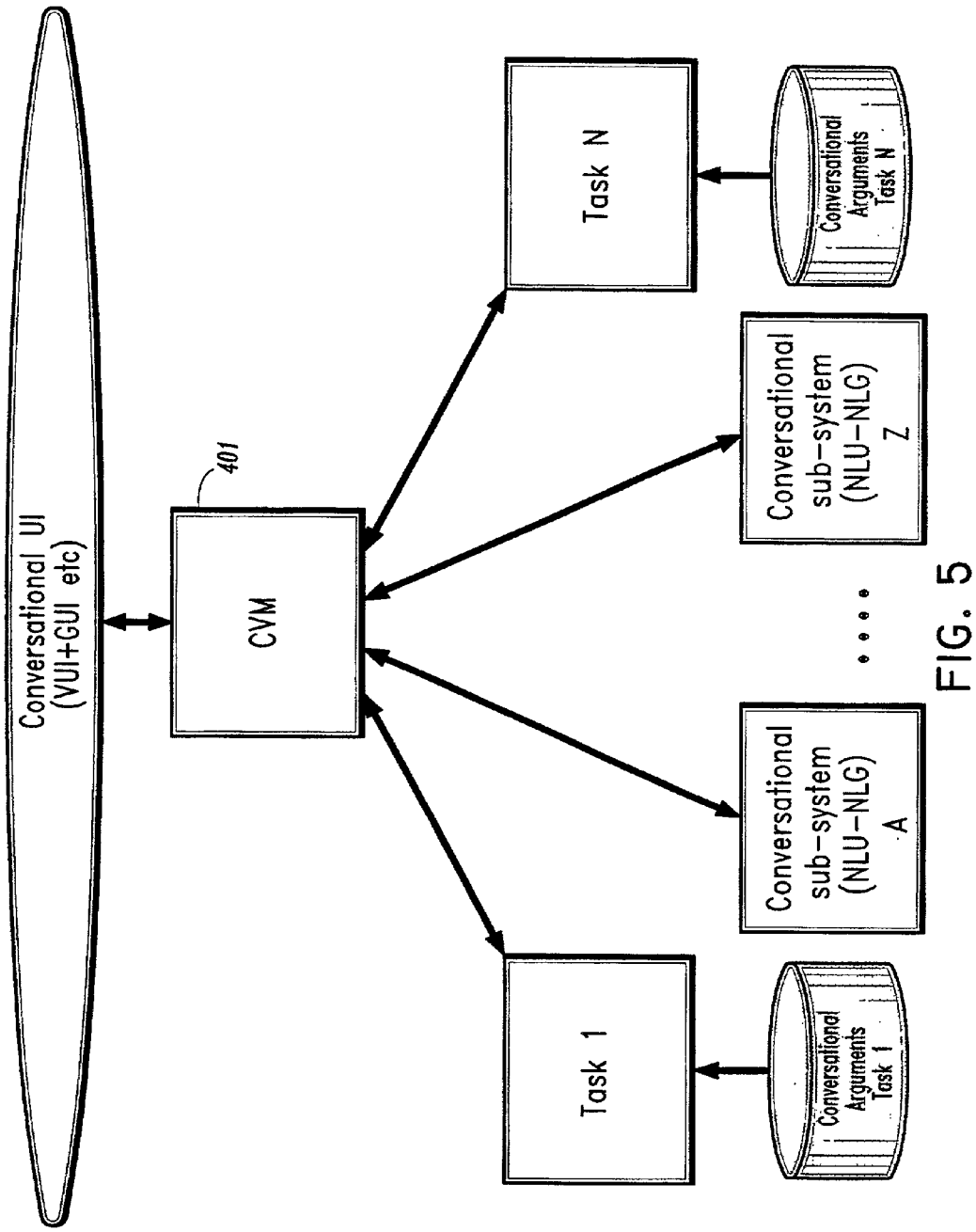
FIG. 5 is a diagram illustrating task dispatching process according to one aspect of the present invention.

FIG. 5 illustrates the function of the dialog manager 404. As shown, different tasks (task 1, task N) and resources (conversational subsystem A–Z are managed by the CVM 401. The CVM 401 decides which application is active and how the context is to be modified (as explained above with the dialog manager and conversational protocols). In distributed applications, this function is performed by transmitting messages as per the dialog manager protocols discussed above. It is to be understood that the dialog manager protocols are used to exchange information between local parallel applications. The capability to manage the dialog and context across multiple (local or networked) dialogs/applications that are unknown to the dialog manager and engines when designed is what is referred to as generic NL processing and pluggable dialog managers and NL applications.

It is to be understood that applications can make calls to the CVM 401 directly (via the CVM APIs as discussed above) or directly to the operating system (or underlying system such as a JVM (java virtual machine) or an operating system such as Microsoft Windows. When call are made through the CVM 401, they are registered through the task dispatcher/controller 402 and the dialog (which can be multi modal and even without any speech input or output) is managed by the dialog controller 404. When the call is complete to the underlying operating system, the dialog controller 404 will interact only indirectly with the application, i.e., the conventional calls are managed by the conventional task manager 417 and, thus, taken into account by the task dispatcher/controller 402 when passed and or because the task dispatcher collaborates/commands the conventional task dispatcher 417. The latter will register the application with the dialog controller 404 and update any status changes that the task dispatcher/controller 402 is aware of. In cases where the conventional applications are managed with a C&C (command and control) interface (or any other type of voice interface), the application dialog is registered and controlled by the dialog controller 404 through registration with the dialog controller 404. It is to be understood that these are particular cases. But, in general, when backward compatibility or non-conversational applications are not an issue, the dialog controller 404 will control the dialog of all applications and manage the context through the context stack 405. It is to be appreciated that the CVM 401 can re-implement all the conventional functions, services and behaviors. In this case, the CVM 401 does not execute as a platform on an conventional operating system and acts as an operating system on its own capturing all the conventional calls.

The CVM 401 further comprises a meta information manager 403 which manages elements such as files (or other similar entities adapted to the device such as records or name spaces), directories, objects and applications that are associated with the CVM 401, as well as any other resource or object (local, networked, etc.) and information about the user (preferences, security habits, biometrics, behavior, etc.) The meta information manager 403 manages these elements by associating such elements and system resources with high level of conversational abstraction via abstract categories and meta information. Object representations, for example, are expanded to encompass advance knowledge representations like content driven meta-information that is associated with each object (e.g. security feature (user and author), associating of file with abstract concepts like picture, drawing, image etc.). Each of these elements are associated with one or more of a plurality of meta information categories. These categories are defined either by the operating system, the application or the user. Each file, directory object and application can be associated to one or more of the defined categories by pointing to the category definition and associated functions or by registering them to these classes. As explained in detail below, the abstract meta information can be used to provide shortcut to, or automatically extract and process elements of the file system or any other object, resource or user.

More specifically, the meta information manager 403 manages the file system using abstract meta-information and protocol with multiple categories. These categories can be defined the by owner/developer of the resource or by a past user/application of the resource. Advantageously, CVM 401 relies on associative memory concepts as opposed to conventional file management systems, wherein information about files is captured by operating systems in three major forms: (1) extension of the file name; (2) header of the file name; and (3) file content type (binary versus ASCII) (although the abstract category concept described herein can significantly improve such conventional file system). In a conversational system, an additional level of abstraction is added to characterize the content or role of the file. For example, each file can be associated with a set of abstract classes characterizing the file (whereas conventionally, a GIF file, for example is associated with a software application to open or edit the file by default). In addition, multiple directory/file system displays include or exclude by default these extensions from the displayed information. Any other image type of file will need to be registered at the level of the application or preferably at the level of the operating system, in order to take advantage of any automation process. Conversely, incorrect or ambiguous file extensions can often lead to incorrect automated tasks. On the other hand, headers convey more detailed information about the content and the processing requirements of a given file. However, currently, headers like MIME headers are usually designed only for class of applications, e.g. e-mail, or protocol and language, e.g. HTTP and HTML.

In accordance with the present invention, files are associated with abstract meta-information. This can be done automatically such as with a topic or image classifier, or explicitly by the application, user, platform etc. For example, the concept of images, pictures, movies, drawings can define diverse abstract categories. A file can therefore be characterized by these different terms independently of the format, extension, and/or usage of the file. In addition, the CVM affords the capabilities to add categories across applications, either by application developers (with are then registered) or by the user (customization or usage).

It is to be appreciated that this abstraction can also be extended to directories, objects and applications, and not just files. For example, concepts like links, macros, shortcuts and even bookmarks can be associated with certain categories. These categories allow, for example, to display all the financial applications or all the financial files, versus all the drawing applications or all the image files.

The meta information manager 403 will associate any object provided or built on the CVM platform to a double linked list of categories. It is to be understood that other implementations can be employed which implementing the same functionalities. The CVM platform contains a repository table of all defined categories, which is managed by the meta information manger 403. Some categories can be user or application dependent. Using CVM platform system calls, a user or application can create new categories and associated new objects to these categories. This is especially true for the file system. Moreover, dynamic information provided by the CVM platform or by the user/application through system calls can be added to each object: date of creation, date of use, who used it, when, how often, who created the object, who compiled the object.

The content of an object can be indexed based on information provided by the object, application, user or platform. These indexes are part of the dynamic information associated to an object. Indexing and/or topic detection can be done on the fly when possible or in batch mode.

Furthermore, just as meta-information can be associated to available resources, it is to be appreciated that meta information, abstraction and abstract categories can be associated to each dispatched task and processes. Besides process and load management, this afford very specific selection of tasks. For example, with one conversational request, the user can listen to the output of a task or re-claim the input (e.g. microphone) for a task down the context stack and direct a wave file, or an ASCII file, to append to the input stream. Similarly, by way of example, the user can re-direct the printer where a file is sent, by giving a single redirecting request.

It is to be understood that the concept of using abstract categories at the level of the file system is preferably extended to any object and/or resource that is either available or accessible by the CVM operating system. As such, it is to be appreciated that for networked and distributed applications, the meta information manager 403 can manage a plurality of meta information categories that are associated with non-local objects or resources (e.g., file, directory, disk, object, peripheral, application etc.), which are defined by the owner/developer of resources or a past user/application of the resource. Indeed, it is to be appreciated that the abstract categories are independent of whether a particular resources are local or networked, and that either through access or connection to a resource, the resource can register to abstract categories or can even create new abstract categories. More particularly, new objects accessible not yet accessed must register their meta-information, which registration process may occur locally when a machine connects to it, or it may be to a server similar to a DNS approach or name space manager) where it registers its self, its content or its categories. This protocol is also used locally when an application or object is downloaded or transferred to the machine (e.g. via ActiveX, Javascript, Java applet, Vbscript), thereby allowing an application to automatically register/active its abstract categories. The registration protocol (as described above) is utilized to automatically create new categories associated with new non-local objects either upon connection with a remote system or via a meta information server (analogous to a DNS server or name space manager) which updates the list of abstract categories associated with an object or its content. The self-registration mechanism allows new objects that are downloaded from or forwarded to the network to communicate its associated meta-information and register locally using the same protocol. Double linked lists and repository can be appended to the platform list. Whenever a resource register new categories, the new categories are pointed as associated to that resource. When the resource is destroyed, the corresponding categories are eliminated.

As with the meta information associated with local objects, the abstract meta information can be used to shortcut, automatically extract or process non-local elements of the network. These resources should be memorized, at least for a while, within the set of active abstract categories or registered resources. Each remotely accessible non-local object or resource can be associated with these different categories by pointing to the category definition and associated functions or by registering them to the appropriate classes.

For example, it becomes possible to refer to "watson" resources as all the resources that are part of the watson.ibm.com intranet or all the printer resources or all the financial home page visited. Currently, with a conventional browser (ore viewer), URL to pages or files can be stored and then manually classified by the user. As a result of our approach abstract categories would be automatically created or subscribed to based on header formats or other meta-information contained initially within the HTML (e.g. within a specified comment field with the current HTML specification, or within an appropriate meta tag or because of an additional conversational protocol handshake). Therefore, the bookmarks would be automatically categorized when accessed or added.

The meta information manager 403 and repositories collects all the information typically assumed known in a conversational interaction but not available at the level of the current conversation. Examples are: a-priori knowledge: cultural, educational assumptions and persistent information: past request, references, information about the user, the application, news, etc. It is typically the information that needs to be preserved and persist beyond the length/life of the conversational history/context and the information that is expected to be common knowledge for the conversation and therefore, has never been defined during the current and possible past conversational interactions.

Uniformity of the data stream processing is an important way to simplify the abstract categorization via meta-information and allow categorization under a similar abstract category, file, object, applications as well as local or networked resources.

The interaction between the task dispatcher/controller 402, dialog controller 404 and context stack 405 of the CVM 401 in processing input and output data streams will now be explained in greater detail. It is to be appreciated that the present invention provides NLU interfaces with contexts and mixed-initiatives sorted across multiple tasks (with multiple domains). More specifically, the present invention provides the capability to have a natural dialog with NLU, NLG and mixed initiative across multiple applications, with multiple domains. In this regard, each application will provide the CVM 401 its own parsing and translation arguments. As explained in greater detail below, the NLU engine 410 can either tag a query sequentially (form filing) or in parallel (e.g., procedural threads or parallel conversational objects/procedures or parallel forms). The first task to have its dialog completed by producing a non-ambiguous query is executed and the corresponding query as interpreted by the other application is stored to activate if the recognized query is rejected by the user.

It is to be appreciated that conversational biometrics can be used to collect any context and meta information on the user not only to customize or adapt for purposes of user preferences or to authorize a query, but also to use the information to perform more robust recognition. Accordingly, any information can be accumulated to recognize the user. Namely, the usual phrasing of a query, the type of query phrased, command frequency (often used, not often used), preferred applications, time or usage, etc. Conversational biometrics may be built using the methods disclosed in U.S. Pat. No. 5,897,616 entitled "Apparatus and Methods for Speaker Verification/Identification/Classification Employing Non-Acoustic and/or Acoustic Models, which is commonly assigned and incorporated herein by reference.

Figure 6:
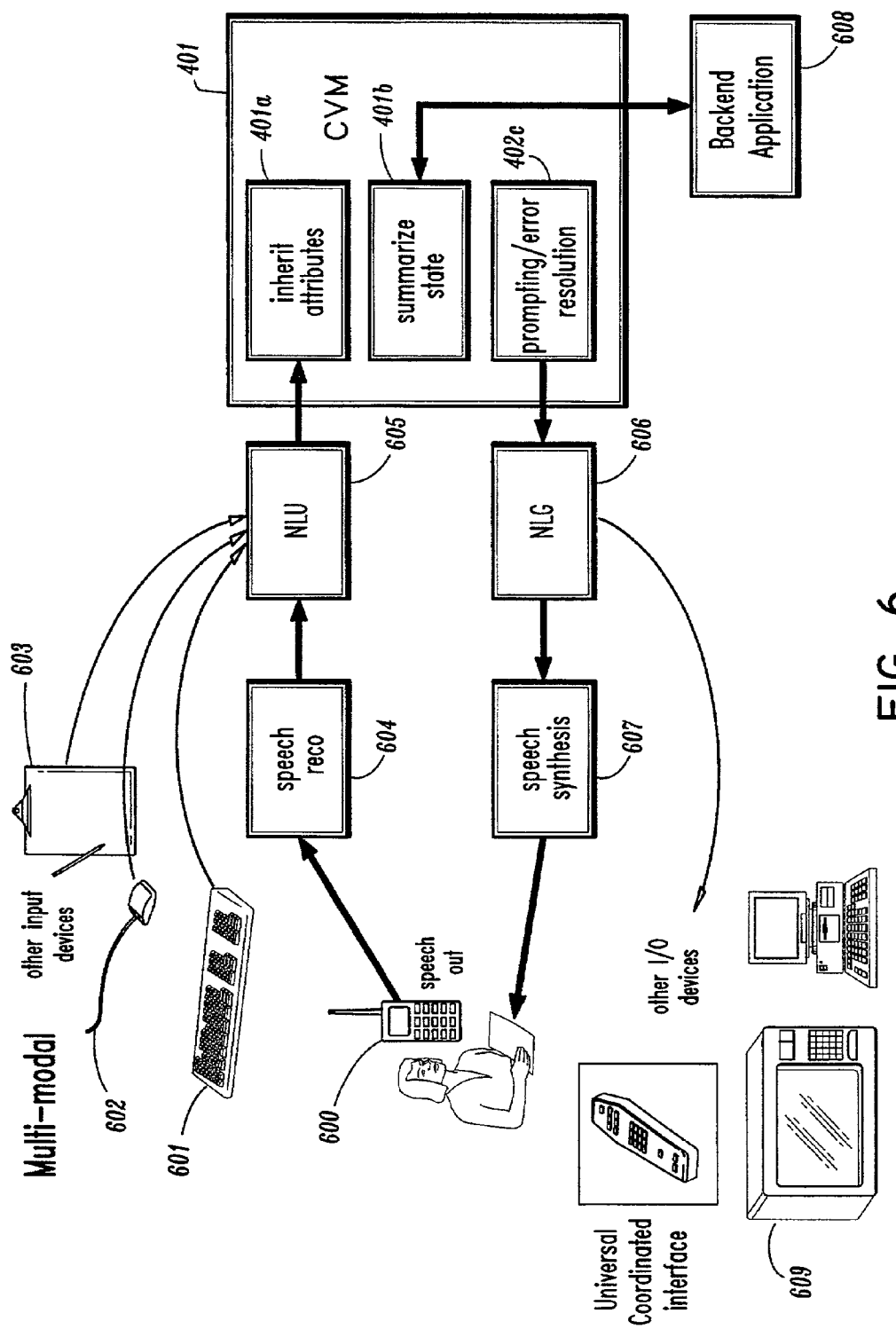
FIG. 6 is a diagram illustrating a general conversational user interface and input/output process according to one aspect of the present invention.

Referring now to FIG. 6, a diagram illustrates a conversational input/output interface in accordance with one embodiment of the present invention. As illustrated, a conversational input interface according to an embodiment of the present invention can process multi-modal input, that is, files/streams/resources, speech via a phone 600, keyboard 601, pointing devices 602, handwriting devices 603, including natural interfaces. This means that all the input and output events across all the modalities are caught and transferred to the dialog manager (that also stores it appropriately in the context stack). Spoken input from a speech client (e.g., telephone 600) is subject to a speech recognition process 604 and other input (e.g., keyboard, mouse clicks etc) are subject to NLU processing 605. Each input is subject to attribute acquisition (401*a*) whereby the attribute value n-uples are acquired from the input. A summarization process 401*b* is performed whereby the attribute value n-uples are added to the context and then verifies with the syntax of the back-end application 608 whether the query is complete, incomplete, or ambiguous. The backend accesses are also tracked by the dialog manager and the context manager. It is sometimes possible to distribute some of the "intelligence" tot he backend by loading some disambiguation capabilities (a feature of the dialog manager) to the backend. Individually, each input stream behaves the conventionally. The key conversational aspect is in the input procedure wherein commands can be entered in NLU (to provide natural language understanding of input queries) or in FSG mode (for constrained input according to rules: grammar and vocabulary, as opposed to free natural input). Commands or queries can be completed or corrected by completing missing fields or by correcting incorrect fields for the active task. As such, the CVM introduces new issues not met with conventional OS: simultaneous input streams to be merged which create input ambiguity. For example, input may now combine input keyed on the keyboard, handwritten input and speech input, not to mention possible input from re-directed streams. Therefore, the present invention provides a mechanism to resolve any ambiguity. This may be performed as explained in the above-incorporated application U.S. Ser. No. 60/128,081.

In accordance with the present invention, the input problem is treated as a merge of the output of multiple decoders, ASCII transcription or a list of attribute value n-uples. Each input stream is converted into its ASCII transcription and aligned with input time-marks via speech recognition processing 604. When different input stream are associated to the same task, the transcripts are merged as follows. First, commands and queries are sorted based on the time marks and appended to a single data stream. Command formulation can be checked against FSG rules and re-sorted to satisfy the grammar rules. NLU queries do not necessarily require re-sorting. For NLU queries, the symbolic fields are filled for each stream, then compounded at the level of the final input stream. Arguments such as spelling and alpha-numeric code do not exploit grammar rules or NLU to solve ordering ambiguity. Time-marks are used similarly to build a unique stream. However, the input is fed back to the user for confirmation, with possible pre-filtering using a dictionary or FSG rule book which is application-dependent.

For networked-based interactions, as explained above, each machine registers with task dispatcher/controllers of other devices in the network and provides information about its conversational capabilities. In other words, a regular desktop will register full conversational capabilities, whereas a phone will register (smart phone) or have its server (regular phone) register as a display-less keyboard-less, pen-less, pointer-less devices, a PDA will register as a mono-window device etc. Only relevant input are exchanged between the systems.

In summary, the input procedure provides a set of multi-mode input streams, each transcribed into an ASCII command, query, or list of attribute value n-uples. Each input entity (command, NLU query field or argument unit (isolated letter, word etc.) are associated to time-marks and appended accordingly to a compounded input stream. Should two or more stream have exactly the same time-marks, they are prioritized based on when each input stream contributed previously. Compounded inputs are checked against possible FSG and dictionaries and optionally fed back to the user. Each resource exchanges their conversational capabilities and the input stream is tailored to only exchange relevant information.

With regard to conversational output dispatches and interface, the CVM 401 produces output to files/streams/resources, display (single or multi-windows, GUI, color, images, movies), audio. Individually, each output stream behaves conventionally. However, according to the context stack 405 and task dispatcher/controller 402, the output of multiple processes can simultaneously collide on the same output stream (e.g. a same display in text mode or the speech synthesizer). Also the output of one task can be multiplexed between several output streams.

Each output stream can behave conventionally. Alternatively, the output can be either the output of a task or the generated output of the dialog process (e.g., directed dialog or mixed initiative). Different categories of output streams exists. For instance, with a mono-channel output (e.g., dummy terminal (VT100 or Palm Pilot screen) or audio only output), all the output messages using this resource use the same channel (or sometimes share a same channel) (e.g. speech output, unique window/screen and/or text output). With multi-channel output, a separate channel exists for the output of each task (e.g. Windows GUI). Output streams of multiple tasks to mono-channel resources are queued based on the content stack 405 and the priorities assigned by the task dispatcher 402. When a mono-channel output is provided to the user, the event becomes active and it is brought to the top of the context stack. Multi-channel outputs are not prioritized but updated asynchronously, without having the task popped up to the top of the stack.

It is to be appreciated that outputs from each task can be multiplexed to multiple output streams based on output handle assigned by the task but modifiable by the user. For networked-based interactions, each machine will register with the task dispatcher/controllers of others connected device in the network to provide information regarding conversational capabilities. For instance, as explained above, a regular desktop will register full conversational capabilities. A phone will register (smart phone) or have its server (regular phone) register as a display-less keyboard-less, pen-less, pointer-less devices, a PDA will register as a mono-window device (e.g., Palm Pilot) etc. Only relevant outputs are exchanged between the systems.

It is to be appreciated that all the output, in particular voice output, can be customized and programmed by the user. Selection of the voice speaking the output can be made like fonts can be selected for text display. In such case, we speak of Voice fonts. More complex conversational presentation are prepared using conversational formatting languages. In summary, CVM 401 provides a mechanism to queue the output of multiple tasks to mono-channel output based the context stack 405 and the task dispatcher 402, as well as a mechanism to redirect or modify the resource assigned to each input streams, even in multiplexed cases. Each resource exchanges their conversational capabilities and the output stream is tailored to only exchange relevant information, including selection of the output Voice fonts and formatting of conversational presentations including GUI events, and other audio content.

The input/output processing by CVM 401 will now be explained in further detail. As explained above, various activities must be appropriately organized by the CVM 401. For instance, basic system calls must spawn multiple actions involving different subsystems. Such actions include executing a task, listening for new input, and producing an output/feedback. By way of example, the task dispatcher/controller 402 will decide on the basis of the context stack 405 the different statistical parsers that must operate on a query for the dialog controller 404 to identify the active context and complete the query. These actions must be appropriately prioritized so as to, e.g., execute completed queries and update the context stack 405, provide feedback to the user for incomplete or ambiguous queries/command, allow new input to be decoded and run down the context stack 405, and return output of executed or running processes.

The task dispatcher/controller 402 associated each task or device with a conversational engine with conversational arguments. When there is one engine per application or device, the NLU engine of each application or device can be parallel (procedural threads) or serial (form filling) (as described above). When multiple device/applications share the same engine, the NLU engine needs to be parallel with procedural threads. Rejection or likelihood of a new query is managed by each activated task based on the conversational arguments. Queries that are rejected or too improbable cause the dialog controller 404 to peruse down the context stack 405 to look for the next available context. Each action, completed query and conversational argument of an active task as well as each returned value/result are stored on the context stack 405. In addition, a returned value and results activate past contexts, when appropriate.

The task dispatcher/controller 402 divides each command/process into multiple actions, starts the associated threads/processes with the appropriate priority and relates/inserts them within the context stack 405. The task dispatcher 402 allocates each resource and shares them between the different spawned actions, and controls handles and streams to and from the resources. Based on the modality (pointer, keyboard, file, speech), the task dispatcher 402 redirects the stream to the appropriate conversational subsystems or conventional subsystem with speech inputs being transcribed/understood. The output of these subsystems is run down the context stack 405 to extract the active query and complete it. On the other hand, outputs are queued based on the priority levels of each task and dispatched sequentially to the output resource.

Each new (active) task/process/thread creates a new stack entry in the context stack 405, with or without activated discourse. The context stack 405 is associated with the machine state stack so that for any new input from a user, the context stack 405 can be traversed until the input context can be appropriately established. This essentially amounts to finding and selecting the active discourse between the user and machine among the last and past discourses, possible going back into the history. The selection process will now be explained in greater detail. In addition, each task is associated with a mixed initiative layer. This layer can be as simple as the conversational equivalent to the usage information of a command line in conventional operating systems. The dialog controller 404 will first check a user command query for completeness or ambiguity at the level of the syntax of the command query. Commands that are deemed incomplete or ambiguous will be returned similarly with priority level (top for the application under focus) to the appropriate conversational engine 407, which will generate a request (a prompt) for the missing or ambiguous information and update the context (requested missing fields). It can also simply mention that the request is incomplete ambiguous when unable to better formulate the prompt (e.g. legacy application).

On the other hand, complete and non-ambiguous commands will result in certain results (e.g., outputs or actions). These results are similarly returned to the appropriate conversational engine 407 with a priority level and update the context, unless if re-directed by the user as in conventional systems. However, the re-direction can be more sophisticated as it can involve partial mixed initiative notification while re-directing the results. As explained in further detail below, it can be implemented, for example, with a conversational assistant. This would be extremely complex to achieve with a conventional system and it would probably require redirecting the output to a specially written script. Command may also require user confirmation before execution based on the preferences/settings coming from the CVM platform, application, or user preferences.

Completion/search for the active context is performed from context to context down the stack. That is, new queries or arguments are compared by the dialog engine by going down the stack until an acceptable match is obtained and optionally confirmation is obtained from the user. As soon a context is found that fits the utterance at the level of the NLU symbolic language, the context becomes active and the corresponding process becomes active. Until the active command is completed, or until a new command is provided, the selected context is marked active, and pushed to the top of the context stack 405. When a message is returned to the user, the context is updated and then pushed to the top of the context stack 405 under the active context. The active context is updated to inform of the existence of a returned value. This can also be done at the level of the superseding CVM session discourse, which can be in the stack or always besides the stack and then searched right after the active context, before going down the stack. Simultaneously completed tasks result in contexts that are arranged under the active context according to CVM priorities (e.g. FIFO or FILO). Active contexts sufficiently completed to generate a task will be pushed down the stack under the next or all the returned contexts. Or it could become the active discourse. This may be done automatically or when commanded by the user. This stack structure allows to maintain non-ambiguous conversational interactions with multiple tasks, threads or processes.

If the request is complete, it will be executed, pending possible request for confirmation by the user, e.g. when it is irreversible. Otherwise, mixed initiative is used to continue the completion or correct the query/command. Whenever, a command/request progresses, option is opened in the context for rejection of the discourse by the user. This would mean, restoring the previous stack status (and program status) and pursuing down the stack. The user would have to explicitly request going back up the stack. If the user rejects or immediately completes his/her input prior to execution or notification of execution to the user, the new input is appended to the active utterances and the search is re-started from the top of the stack. Any other utterance provided by the user, before the active context is established, is stored in a buffer and considered as appended to the active utterance (speech utterance or any other mode of input). The context stack is updated pending on voice, keyboard, mouse or any other input or command and on the application output.

A particularly useful feature provided by the CVM 401 in accordance with the present invention is "conversational memorization." Conversational memorization is the capability to delay and return to a task and context that is assigned by either the user, the platform or a specific application. In general, instructions/commands that are initiated by the user are explicitly sent to the background of the system. Such commands can involve launching daemons or agents assigned some specific task or functions. They can also involve memorization, whereby the CVM "takes notes" of a command or event and either reports it or execute it and returns to the user at a particular time that is selected by the user or by default (e.g. at the end of the session). Therefore, an output or background task can be re-directed to present their results at a subsequent time. Conventional agents are activated. At the difference of conventional background tasks and agents, when reminders or results are returned to the user, the conversation context at the moment of the memorization request is restored. At the time memorization occurs, a snapshot of the context stack 405 is made and stored as meta-information associated to the memorized task. The context stack 405 are rearranged at the time the memorized task interacts with the user. The current context stack is stored and the old context stack is added on top of the stack, with possible updates as programmed by the user or application developer or imposed by CVM, based on intermediate changes die to the evolution of the context and dialogs between launching the task and its completion. When the interaction of the user and memorized task is complete, by returning to a previous context, the previous context stack is added on top of the stack. When context stacks are added, any overlap can be removed at the bottom of the stack. The user, platform or application can decide to only preserve save portion of the stack. Conversational assistants perform such tasks. They can be implemented by agents and daemons simply running on their own and re-interact with the user only when producing output. Their output is sent to the user according to the priority level of the task. When becoming active the user can easily update the task associated to the agent. Conversational memorization, are rather tasks inserted at the bottom of the stack and executed only when the stack is emptied at the end of the session. Occasionally, they can be inserted higher in the stack or pushed to the top of the stack at a pre-decided moment. Memorization tasks are executed only when active. The memorization feature affords the capability to memorize past actions, preferences and instructions.

As indicated above, memorization save a snapshot to the active context to restore the conversation associated with the reminder. It is also important, however, to be able to summarize the conversation and context to the user at that moment. To perform this, the application developer of an application (and/or the user preferences or some decision taken by the CVM platform) can provide the fields (i.e., the attribute items) that should be summarized and presented to the user if they have been filled. This is stored as extra fields in the meta information associated with each variable/attribute of the system. Typically, the application developer can also describe how each field should be addressed (with a usable abstract name) instead of with its actual variable name or attribute designation. The summarization can then be activated upon a decision by the application (reactivation of the application), or by query of the user, or by CVM. It will search the active process, recover the context, and summarize the "filling status of the attribute n-uples associated with the query". The summarization task is a service of CVM similar to any other application, whereby the user can dialog with the summarization application to obtain more details, or move further back in time for summarization. This can be as simple as saying "go back to application X" or by stating "you were telling me to do Y" or very complex with more detail to trace back through the history of the dialog.

Another feature provided by the CVM 401 is conversational re-directions. As it is easy to re-direct input and output of Unix processes, for example, conversational re-direction performs the same functions. However, the re-direction can be more sophisticated as it can involve partial mixed initiative notification while re-directing the streams. Using conversational calls, it is possible to discriminate the output between process results and notifications to the user with levels of priority.

Again, as explained above, meta-information, abstraction and abstract categories can be associated to each dispatched task and processes, which provides specific selection of tasks. For example, with one conversational request (or by pressing a button on a keyboard or clicking a mouse or providing a key), the user can listen to the output of a task or re-claim the input (e.g. microphone) for a task down the context stack and direct a wave file, or an ASCII file, to append to the input stream. Similarly, the user can re-direct the printer where a file is sent, by giving a single redirecting request.

Based on the configuration of the option/preferences, on the load on the system or on the capabilities of the system, the task dispatcher/controller 402 can decide to execute task on networked processors or to defer some task until another processor can be used to understand the input, activate and be able to understand the input, or a when a device which is capable of performing such task is available on the network. Typically, deferred dictation on a low-end hand-held device would follow this model. Again tasks are memorized on the task and memorized from session to session until the server side is active and able to perform the transcription. Similarly, shared interfaces between a local machine an a server machine can be managed by the task dispatcher/controller 402. For example, a name dialer application can be added to a conversational smart phone. The names that are often used are stored locally and recognized. On the other hand, unknown names or names that were never used before are sent to a more powerful networked machine for recognition and then download the updated information (phone number to dial etc.). Similarly, all the information that is locally stored can be periodically synchronized to update the phone number information. This process of local vs. server based recognition is hidden by the task dispatcher 402. The networked shared tasks are managed by the users as several discourses, independently of the machine where the task is executed. This is one illustration of the usefulness of a uniform CVM API across all platforms for all transactions. This is similar to the method and systems described in the above-incorporated Ser. No. 09/806,425 for providing coordination of conversational services between networked devices using conversational protocols. In addition, a distributed architecture and distributed processing between client and server leads to new requirements of conversational networking. Such requirements involve management of traffic flow and resources distributed across the network to guarantee appropriated dialog flow for each of the users engaged in a conversational interaction across the network. The elements described in Ser. No. 09/806,425 can be employed herein for conversational interaction across the network (e.g., server load management to maintain dialog flow, engine server selection based on the task, features, and capability requirements and conversational argument availability (data files), conversational protocols, audio RecoVC (recognition compatible VoCoder) providing a coding protocol with pitch that allows reconstruction for play back etc.

It is to be understood that the task dispatcher/controller 402 presents radically new dispatching behavior, relative to a conventional OS, which does not share the conversational and conventional subsystems in the manner described herein by a CVM does. Indeed, with a conventional system, text-input is always sequential within a window and associated to one and only task. The capability to handle multiple simultaneous tasks with a keyboard and text displayed in a unique window would require to use most of the principle of conversational dispatching as described herein. The task dispatcher handles the issue of maintaining the dialog flow and, therefore, minimizes any delay die to the network and CPU load. It will prioritize the CPU cycles and available network route and resources to guarantee that delays on the dialog are minimized to acceptable levels. When an engine becomes a bottleneck, it receives more CPU cycles (higher priority, until the backing is reabsorbed). Again, this is related to conversational computing. When a network route becomes too slow, it will fine another route or another resource to minimize the delay. Otherwise, it will warn the user of possible delays in the response. Dialog flow for the active dialog is a priority of CVM. Dialog flow and minimized delays for the active dialogs of all connected users is the function to optimize by the CVM on router gateways and servers in the network.

Another feature provided by a conversational CVM system is "conversational security," whereby meta-information relating to the author and/or modifier of local or remote files, especially executable files, can be used for security purposes. In particular, with speech-based conversational systems, since each command conveys not only the formulation of the query but also enough information for authentication of the user using, text-independent speaker verification can be used to identify and verify a user. In this manner, the automatic (and transparent) authentication of the user can be made whenever a query to a restricted resource is made, based on security meta-information associated to the resource. As noted above, all the information collected about the user queries and history can be used to contribute to the recognition (ID or verification) of the user.

The authentication an be performed either directly on the request or using non-expired information acquired shortly before the query. In particular, authorization for access to files or application can on a query by query basis. For instance, if a user requests a restricted service, the request may be verified with respect to the set of users that are pre-authorize to access that specific service. The authentication can be performed via open-set speaker identification performed on the request (e.g., file access, directory access, application opening, executables, connections, encryption/decryption, digital certification/signature). Resources having different passwords or a user ID associated with a similar user can be seamlessly accessed with no explicit login or password authentication. In any event, non-obtrusive user authentication can be continuously and transparently performed through user dialog.

In accordance with the idea that a conversational VM can be implemented even with no speech input, the stack of contexts should contain the identity of the user as the most recently authenticated identity. In addition, each resource should contain the list of authorized users as well as some security requirements (e.g. in a non-speech case the expiration date of the latest authentication). Of course key-strokes or pen based authentication can also be considered, but it is not at all mandatory.

Each resource can also log/cache the identity of each user attempting to access it. These logs could then be encrypted and subsequently used to recognize access requests to previously accessed resources. In particular, the operating system can intercept password requests from an external source and complete the request using the log transparently to the user. New resources can transfer a login request while registering their meta-information so that even the login process can become completely transparent to the user. This is an extension of the concept of single sign-on or password vault.

Another feature that is provided by the CVM is "conversational customization," whereby access to each task or resource can be individually customized to preferences of the user requester. For instance, the personality/behavior of the CVM (e.g. synthesized voice—Voice Fonts) can be automatically customized to an identified user's preferences. Until the user explicitly logs out of the CVM instantiation (i.e., terminates the session), the customization and preferences are frozen. Such systems or applications are multi-users, but one user at a time once and for all until the next log-in.

As explained above with respect to conversational security, automatic identification of the user can be performed whenever a query to a resource is made. The authentication can be performed either directly on the request or on non-expired information acquired shortly before the query. Tasks and context are prioritized according to the sequence of active users and re-prioritized at each user changes. Environment variables and preferences can be modified "on the fly" based on changes of the user identity without requiring the reset of the whole environment. Ambiguity can be resolved at the level of each context or the context stack using the user identity. In distributed cases, with either user or server changes, the context should be update whether it be loading the context from the client to the server or recovering a context maintained on the server, or transferring the context between servers.

Conversational VM can adapt dynamically to the preferences of multiple users and to the active context. It allows multiple users while actively running. In a speech-based system, each command can be used to perform text-independent speaker identification. Any change of user automatically implies the creation of a new active context which pushes the previous context down the context stack, unless the new active context is waived explicitly by the new user or the active application. User changes automatically change the priority along the context stack to first handle a task associated to the active user.

Since user identity can be associated in the context of each discourse, command ambiguity can be immediately and transparently resolved (e-mail from my mother is correctly understood, independently of the user). The process of traversing the context stack 405 is advantageously enhanced by associated discourses to a same user, except if waived by the owner of the discourse, the associated application or by some options. Exceptions to this rule while traversing the context stack may automatically imply that the discourse becomes flagged as multi-users. As discussed above for the conversational security, the user identity could be obtained through alternative procedures such as manual selection or input by the user of his or her identity. Changes of the active user identity also have an impact on the conversational security subsystem. Each resource can log the identity of the user accessing it.

In summary, with respect to conversational multi-users and conversational security, it is to be appreciated that dialogs, categories, meta-information, and access to resources can be a function of the identity of the user and its associated meta-information history. And conversely, the conversational information collected on a query can be used to recognize the user. The meta-information associated with each object can be consulted and updated before and after each action or access. When an object is created, modified or consulted, information about the user is added to its meta-information so that the meta-information comprises security and preference fields associated to each object. Access to an object is based on its content, date of creation, history of access and modification and other meta-information. Access is controlled or configured not only based on the identity of the user but on additional meta-information like the date, the usage history, the opened applications etc. In other words, it is possible to allow a person to access a file provided that the file is opened to display on the screen or play back or execution. However, the person is denied access to open the file to copy its content to another object. In addition, meta-information can be tagged in an un-erasable fashion to an object.

Another feature offered by the CVM is "Conversational search," whereby search capability is based not only on the name, modification or ASCII content of files, but also on abstract categories defined by the operating system, the application or the user, as well as topics that may be extracted on-line or off-line by the operating system, or obtained via protocol when the object was accessed. In addition, contextual search capabilities may be used to complete active query or to extract similar queries/context.

In particular, resources can be searched based on the abstract categories that associated with each of the resources. These categories may be either defined as previously described in the context of the meta-information concepts or based on contextual associations. While a search of all images in a directory as described above is relatively straightforward, a search of "similar image" relies on contextual associations: among all the images in the directory, which images have been used in a similar context (e.g. opened, edited or included, etc., by a resource categorized similarly to the application used to edit the present image). This can be performed by contextual logging/caching of each resource/object access. Categories now can also contain meta-information about themselves. In addition, it is possible not only to search by category or contextual category, but also by user access (and not just by the identity of user modifying it as with conventional operating systems).

Eventually, ASCII, audio and any other sets of transcribable media can be searched based on word parts, words, word topic or context. Topics involve capabilities to identify the topic text. Contextual search involves the capability to search a text for similar contexts as the active context or candidates to complete of the current active query/context. For example, it is possible to extract all the files referring to a given Tuesday, while explicitly searching for the keyword "Tuesday" or for the actual date: calendar entries on Monday mentioning "Tomorrow" will also return these items.

Topic determination of a file can be done off-line when the computer is not intensively used. Only new or recently modified files should be examined. Topics are automatically added to the meta-information associated to each resource.

Contextual information will by definition always be a very CPU expensive task, to be done only at the explicit request of the user. For external objects, the topic can be automatically registered when the resource is accessed (as described above). This does not prevent the local machine to also search the object for it own internal abstractions (defined through meta-information about themselves).

The feature of "conversational selection" is also provided. Conversational selection capabilities are provided at the resource manager level or within any application by relying on meta-information, abstraction and conversational queries/mixed initiative/correction which avoid long sequences of elementary selections and provide natural shortcuts and correction of the selection. Various mechanisms are provided to access and present immediately the skeleton of objects with hierarchical structures.

In particular, it is to be appreciated that conversational selection can be performed in accordance with the present invention using a combination of hierarchical searching (abstraction based selection) as well as complex query capabilities (dialog based selection) from within an active task or application. Conversational selection provides a significant improvement over conventional selection methods. Indeed, even in a GUI environment, displaying the available resources for a given application or query is greatly improved by using meta-information and abstract categories. More specifically, with abstraction based conversational selection (using abstractions and shortcuts) an individual can by-pass menus and hierarchical selection in a manner similar to the way in which speech queries (in IVR) bypass pages of menus via DTMF interfaces. This is one of the major advantages provided by a conversational interface in terms of increased productivity. It also illustrates the uniformity of the interface in that the same interface is used independent of the modality used to access a service (e.g., through a desktop, a PDA or the phone) (e.g., CML such as discussed in the above-incorporated Ser. No. 09/806,544.

For example, consider a backend server that retrieves information from a database and provides the information in HTML format for web browsing, as well as with a conversational header that is built using JSAPI and conversational extensions. When the server is accessed through a conventional browser modality, a person can display the information and select desired information by either pointing or by speaking. If the person accesses the server via phone modality, user selection can be performed through a navigation menu comprising URLs and anchors. These navigation menus are generated from the meta-information that the web-pages transmit via the conversational HTML to the browser.

In all these cases, the menu used for navigation by selection through the web pages or the file system, or whatever other hierarchical structure of object and resources can be appropriately presented in one of various complementary manners. For instance, at the moment of registration of a networked object, the menu can carry meta-information about its structure. Moreover, the system can locally keep track in the meta-information that it associates to each object of the structure (skeleton) of the structure (conversational structure skeletons are described in detail in the patent application Ser. No. 09/806,549, filed concurrently herewith, entitled "Structure Skeletons For Efficient Voice Navigation Through Generic Hierarchical Objects", which is commonly assigned and incorporated herein by reference. Moreover, the system can periodically update its skeleton information, during off-peak use of the CPU.

The system can periodically spider any local or external resource and hierarchical object. Alternatively, in particular dialog structures, each system can subscribe to the accessible resources and periodically, or when accessing, update the skeleton meta-information. Furthermore, meta-information servers can perform the spidering and provide the skeleton information along with the meta-information.

This meta-information describes how to present the menu (TTS) what vocabulary, FSG and NLU needs to be used etc. In addition, mixed initiative and NLU can be used to correct selections without requiring backtracking or completely new selection like imposed by conventional OS and GUI-based selections.

Therefore, with respect to conversational searching and selection, object can be searched or selected based not only on conventional structures (like a file system with directories), but also on meta-information, abstract categories associated to the object by platform applications or users, as well as on the basis of its associated dynamic information. In addition, search queries can be provided in a natural fashion and narrowed down using mixed initiative. Queries can be decoded, parsed and then translated into a logic combination of queries (symbolic query) using NLU technology. Conventional structures as well as categories and dynamic information can then be searched to match the symbolic query. Mixed initiative can be used to narrow down and modify the query based on the results of the search. Matching object can be singled out or accepted.

Other features offered by the CVM are conversational help, manuals and support. One of the most compelling aspect of a conversational interface is its capability to flat the learning curve of a using such system. Indeed NLU and mixed initiative help coaching the user into using each application and controlling the system. However, it is even more important to be able to offer support to the user while he performs a task.

Conversational support offers help and manuals upon request from the user. It relies on history of the user's usage history of the application and of similarly categorized (meta-information) categories. Based on a user's previous actions, the help feature of the present invention will be detailed (e.g, user has never performed task, use has not recently performed task, or the user has always failed when doing this task) or simple reminder (when the user is familiar with this). While the user performs a task, a support assistant simultaneously tracks the application manual. Missing fields, ambiguous requests and series of correction and rejected commands are tracked and used by the assistant to reinforce the mixed initiative with helping dialog. It is to be appreciated that services such as conversational help and assistance, as well as some dialog prompts (introduction, questions, feedback etc) provided by the CVM system can be tailored based on the usage history of the user as stored in the meta-information repository and associated with the application. If a user has been previously interacting with a given application, an explanation can be reduced assuming that it is familiar to the user. Similarly, if a user commits many errors, the explanations can be more complex, as multiple errors is interpreted as user uncertainty, unfamiliarity, or incomprehension/misunderstanding of the application or function.

Different degrees and modalities of help are provided ranging from mixed initiative/usage support, to conversational access to manual (locally and over the network) via NLU request and mixed initiative, topic based search, multi-modal tutorial. It can take the form of conversational technical support involving local or remote agents (e.g. to upgrade or re-install and application in the background). As always, uniformity and coordination of the help interface is of the uttermost importance.

It is to be appreciated that help information can be accessed using NLU queries to access the help information or on the basis of the meta-information associated to the current user (history) and on the basis of the arguments that are missing or modified using mixed initiative. The dialog provided by each application is tuned to the preferences or level of expertise of the user.

In summary, help and support is provided through a ubiquitous coordinated conversational interface, using local and remote resources, user's usage history and agents to complete request, guide through procedure, search for information and upgrade/install new applications.

The following is a more detailed discussion on the programming languages/scripts used for implementing the CVM as described above. Such programming/script languages allow to use any available resources as input or output stream. Using the conversational subsystems of the CVM platform, each input is converted into a binary or ASCII input or attribute value n-uples (or is declarative equivalent-bytes or XML), which can be directly processed by the programming language as built-in objects. Calls, flags and tags are automatically included to transmit between object and processes the conversational meta-information required to correctly interface with the different objects. Any output can be specially formatted according to the needs of the application or user. Multi-modal discourse processing can now be easily built using the new programming tools. The programming/scripting language provides handles, similar to file or stream handles, to the input or output of the conversational sub-systems presented in the conversational system architecture: speech recognition/speaker recognition/conversational system. These input streams are handled as library calls, which are actually implemented by system calls. It is to be appreciated that form the point of view of CVM, a conversational browser as described in the above-incorporated Ser. No. 09/806,544 can be considered either a conversational application or that its components (e.g, XML parser) and plug ins are deemed as part of the conversational engines that comprise the conversational application.

Voice input from a microphone (e.g. the standard voice input) can be arguments of function calls with the sequence of words, phones, or user identity or queries (symbolic language representation provided by NLU). The input can also be provided by handwriting, or from a file, etc. Each of the resulting streams can be seen as derived classes in an object-oriented context.

In the case of platform scripts, the utterances are processed with one of the conversational sub-systems services and processed by the script before inducing actions. A conventional command and control environment (e.g., Voice Center of ViaVoice) can be viewed as a relatively simple conversational platform created with a conversational script. By modifying the script, the platform will be modified. In practice, Voice Center is built with conventional C/C++ code, which hides deep in the code, input handle and command recognition and execution. Context, audio status etc. can be set within the platform to update environmental or global variables. Again, as described above, the conversational objects/components and foundation classes can be procedural or declarative.

The input process described above in accordance with one aspect of the present invention considers that speech or any other input stream is included as a classical input/output stream that is susceptible to all forms of processing typically reserved for character or binary input. User inputs can be represented by their transcriptions or their mappings into a symbolic language after parsing and NLU. Furthermore, outputs can be also completely controlled through the scripts/programming language. Voice fonts can be selected or designed, modified depending on the message. By utilizing such conversational programming language and scripts, complex re-directions and conversation processor or multi modal discourse processor can be built. These are, for instance, the natural multi-modal extensions of conventional word-processors and drawings/photo/video editors. The foundation classed comprising CVM are discussed above.

Furthermore, when exchange streams with other objects, it is important to supplement seamlessly the data stream with conversational meta-information in order to navigate, control or synthesize the stream. When communicated with other objects or subsystems, this is done locally through system function calls. Networked objects communicate through other remote protocols like HTTP/HTML; TCP/IP or diverse forms of socket interactions. These protocols are complemented with tags, flags and semaphores that enable to exchange this conversational meta-information.

Such programming languages are fundamentally new conversational tools that can be under the form of new script language and extensions to PERL and Kshell, C and C++, HTML, Javascript, Basic, Java and more, which can now be named Spoken PERL, etc. Languages can also be built from scratch to optimize the execution on top of the CVM with the libraries of conversational foundation classes and dialog components (procedural or declarative) to be interpreted (script/declarative) or compiled (procedural).

As discussed above, the programming languages/scripts encompass the conversational API between the conversational applications and the CVM. It also encompasses CML (conversational markup language) as described in the above-incorporated patent application Ser. No. 09/806,544. It is worth discussing the distinction between procedural API and protocols versus CML (XML and HTTP), and variations on the transport protocols. Procedural APIs expose CVM to conversationally aware applications. Procedural APIs and protocols allow fast exchange of conversational information between CVMs, applications and devices, as well as fast determination by the controller of the state of each application and context switch require procedural interfaces. CML on the other hand is an ideal way to convey presentation material/content to a conversational browser, which is in line with the purpose of XML, and has the advantage of reducing the programming expertise needed to develop a dialog.

In a conversational browser type of interface as described in the above incorporated application, XML are exchanged between pages but the context between pages and between multiple simultaneous tasks are managed by the browser through API/protocols. The implementation can be, for instance, purely socket based (TCP/IP), Corba/Java RMI based on HTTP based with exchanged of serialized objects (using XML). Preferably, the protocols are designed so that XML (declarative) as well as procedural communications are supported.

Among the possibilities opened by conversational scripts, conversational logic is probably the most striking. At the level of the new conversational programming languages, direct processing on the stream issued and fed to the conventional and conversational sub-systems implies new logic statements and operators.

Logic statements can be the following: (1) true, (2) false, (3) incomplete, (4) ambiguous, (5) different/equivalent for an ASCII point of view, (6) different/equivalent from a NLU point of view, (7) different/equivalent from an active query field point of view, (8) unknown, (9) incompatible, and/or (10) incomparable. Conversational logic operators can be introduced to test or modify such statements. In summary, logic statement status and operators are expanded to handle the richness of conversational queries that can be compared on the bases of their ASCII/binary content or on the basis of their NLU-converted query (input/output of conventional and conversational sub-systems). Logic operators can be implemented to test or modify such systems.

Figure 7:
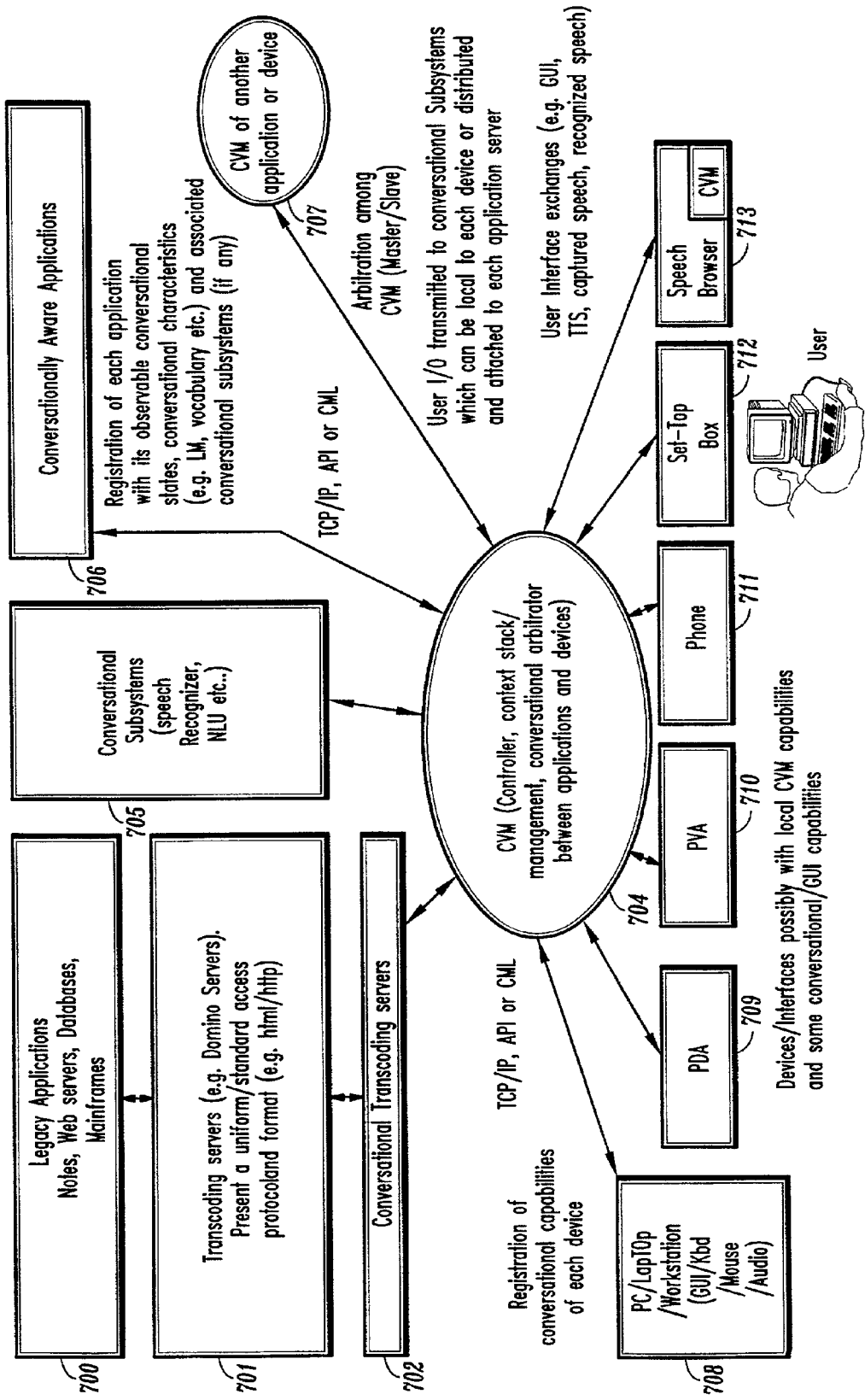
FIG. 7 is a diagram illustrating a distributed conversational computing system according to one aspect of the present invention.

Referring now to FIG. 7, a diagram illustrates an architecture for a distributed CVM according to one aspect of the present invention. The heart of the distributed system is a CVM 704 (which may be located on a server, a PC, etc) which acts as the conversational arbitrator between a plurality of applications 706, devices 708–713, other CVM applications or devices 707 and conversational resources 705. The CVM 704 provides a coordinated uniform conversational interface across such devices and applications, whereby the different conversational devices 708–713, resources 705, applications 706 and can connect through our conversational protocol. A coordinated interface presented by multiple conversationally connected devices/objects. The collection of objects present a single coordinated interface to the user through centralized or distributed context stacks of the CVM 704. The conversational devices can include silent partners that can be controlled via conversational interface from another conversational device. During the registration phase, they will exchange upon request list of supported context. During the connection, these contexts are updated. Depending on the connection, the context is centralized or distributed across the devices (i.e., the network is negotiated).

When a user interacts with the collection of devices, the interaction may always be via a central unit such as a PVA (personal vehicle assistant) 710 in a car, or a speech browser 713. The task dispatcher and context stack accumulates the contexts associated to all the devices and will parse and dispatch commands to each device accordingly. If the user interacts with the entire collection of devices, then a device is always active (the last activated context). This devices check if a new command fits its context stack. If not, it passes to a neighboring device that becomes active. The process is iterated until a match is found, and possibly confirmed by the user, or the request bounces back to the first device. In that case, an error or confusion message is returned to the user.

As discussed above, CVM allows a user to dialog with the system by providing the capability to manage multiple discourses, to use contexts, to refer to objects via abstractions and meta-information, to assign and memorize tasks, abstractions and contexts, to customize to the user, to summarize, to assist the user, even an unfamiliar user, to recognize and authenticate the user and to present the same interface throughout all interactions with the be with or without display, GUI, keyboard or pointing device. The same interaction occurs over the phone, the web, PDA desktop, plus or minus feature irrelevant to the channel For instance, a user may be able to access remotely information about an element of a spreadsheet and modify it if necessary, while simultaneously checking his e-mail. The user may choose to do all these tasks (while in front of his desktop) conventionally, or check the spreadsheet information by voice without looking at it, while finishing typing up an e-mail. In all cases the interface is seamlessly the same to the user.

When multiple devices are conversationally connected, they will coordinate their interfaces so that all the devices can be controlled through the universal CUI. This concept may be illustrated by the following example. Assume that you are driving home one night and remember that your spouse asked you to buy some goods at a new grocery store. After finding the message on your answering machine, you rapidly transcribed it into a memo on your desktop using a speech recognition software. However, you forgot to print it or transfer it on your PDA. It does not matter if your desktop PC runs a CVM since you have, in your car, a conversational PDA, a conversational car PC (PVA, Personal Vehicle Assistant) and a conversational smart phone. Further assume that the PVA runs an embedded CVM while the two other applications are conversationally aware, i.e., you can control them through the CVM running on the PVA.

You can instruct the PVA to dial in your PC using the phone. Once the connection is established, you are authenticated by voice and you find by voice the memo by simply requesting the "grocery list" that you had previously created, without having to remember the file name or the directory or browse through your directory to eventually select the appropriate file. You may need to confirm the selection if your PC CVM requests it. You can issue another query—"it should be synchronized with my PDA!—and the file is appropriately linked to be transferred to your PDA at the next synchronization. One last command—"Do it!"—and your PC gives up and lets the PVA handle that ambiguous query. The PVA understands your desire to synchronize the PDA and the PC based on your previous conversation. After possible confirmation, the synchronization is performed and the grocery list is stored on your PDA, ready for later use.

You now instruct the PVA to guide you turn by turn to the store. Your position is computed, the location of the store is fetched, locally or from a server, and an itinerary is computed to take into account the latest traffic information. At any time, you can request navigation information about where you are, what to do next, how far to go or even request a different itinerary.

Pressed by time, you instruct the PVA to dial the store drive-through server. This may involve an intermediate dialog with a directory assistance service IVR. Once connected to the store IVR, an illustration of the concept of a small business or personal consumer IVR built similarly to current home pages, through the dialog with its conversational interface, you place your order. For this, you ask the PVA to slowly browse through the grocery list and read it to you item by item. You then rephrase the request to the IVR and pursue the dialog until each order is appropriately taken.

By the time you reach the store, your order is ready. You can now drive home and while driving quietly listen to your e-mail or check the news or stock quotes. If needed, you can dial in your PC to consult or modify some spreadsheet information; the same way that you would have consulted it by voice on your desktop while processing your mail. You can also assign tasks to agents on your PVA or desktop, requesting to be updated or reminded later on With CVM running on the desktop and on the PVA and CVM aware smart phone and PDA, the application developer must only hook to the CVM API. It involves registering all its conversational capabilities and requirements:

1. Active vocabulary, finite state grammar and language models to control the application;
2. Symbolic mapping if NLU is supported or at list a context state list;
3. Associated relevant meta-information/categories in particular to allow categorization of the for the output;

4 Conversational I/O information: does it directly control the input/output or is it a silent partner, client to a conversational I/O provider; and 5 CVM capabilities/state: does it run a CVM; is it a CVM client; is it a master, slave or partner CVM.

In the previous example, the PVA was the master CVM. If CVM equipped, the PDA and the smart phone are slave CVMs, or simply CVM aware. When the PVA conversationally connects to the PC, it will be up to the application developer of the PVA, to decide if the PVA acts as master, slave or partner. When connecting locally or through the phones, the devices exchange the necessary information conveyed to by the API, thereby completely defining the coordination among the devices. Again, the CVM automatically handles all the input/output issues, including the conversational and conventional subsystems. Again, the API conveys all the information for the CVM to transform queries into application calls and conversely converts output into speech, appropriately sorted before being provided to the user.

Using developmental tools, the developer can easily build his application around the conversational API and CVM. This development environment (referred to herein as Spoken Age) allows programmers to emulate CVM, to debug applications or networked protocols and to rapidly develop conversational user interfaces. Spoken Age includes the CUI and application development for CVM. It also provides the environment for modifying the data files (conversational arguments) of the engines for a given application. In particular this means that at the level of the tools, Spoken Age also includes conventional engine front-ends like SDK Toolkit like the IBM ViaVoice toolkits. This means that toolkits and the algorithms that it provides allows the user to re-build, adapt or extend the data files for a given task. This involves collecting data for the application following data collection rules and running the appropriate scripts to generate the data file and test the performances. This may involve downloading data files or a portion of data file (from CD ROM or Web sites) dedicated to the task, domain or acoustic environment. This may also involve updating the data based on queries made to a data file generation service office by filling a form and describing the new application/ giving data examples.

Once an application is developed on a platform and for a specific channel, programmers can rely on Spoken Age to port it to any other platform supporting CVM. They can also rely on CVM to automatically adapt its conversational capabilities to the communication channel or to UI constraints imposed by new platform or device. In other words, a spreadsheet, written for voice access over the desktop, can now be accessed by voice over the phone by relying on the phone capabilities of CVM. Also, a Java, CGI and XML/HTML-based web site written with Spoken Age can be immediately converted into an IVR providing services through the phone or a restricted speech mark-up language to be accessed with a small embedded conversational browser.

The distributed system further comprises a conversational browser 713 which is a compelling speech enabled applications that can operate with CVM. A conversational browser can run on top of a CVM and interprets CML to build a conversational dialog while presenting a CML page. As shown in FIG. 7, and as explained in detail in the above incorporated Ser. No. 09/806,544 patent application, legacy applications 700 can be accessed via a conversational transcoder proxy to transcode conventional formats like HTML or DB2 into XML. The conversational browser interprets CML (conversational mark-up language), which is a speech markup language based on XML specifications. It can be viewed as one of the most compelling applications to run on top of CVM. The conversational browser can be stand-alone applications carrying its own CVM. CML allows new experienced application developers to rapidly develop conversational dialogs. Pursuing further the analogy with HTML and the World Wide Web, CML and conversational browser provide a simple and systematic way to build a conversational user interface around legacy enterprise applications and legacy databases. Furthermore, once built on top of CVM, this mechanism can include these applications, services and transactions in the conversation that the user will carry across multiple applications (local and networked) and devices (local and networked). It will also provide the user with the same user interface when he or she accesses a legacy application, a conversational application on his or her PC or an IVR running a conversational browser or a conversational application on the server side. The use of conversational proxies to convert HTML dialogs into CML allows a same page to drive conventional or multi-modal browsers, conversational browsers on PC or embedded devices and IVR applications. An appropriately designed home page, on a server equipped with a telephony card, becomes also a personal IVR. Especially when conversational proxies are introduced to transcode HTML pages into CML pages.

While CVM is to be exposed via APIs and CVM and distributed resources will most efficiently interacts through APIs and procedural protocols, it is important to extend the interaction protocols to encompass HTTP and XML/HTML exchanges. Indeed, HTTP and XML exchanges, possibly or serialized objects, can be sufficient for a single, or for sequential, conversational transactions. The option to select the optimal protocol and allowing XML exchanges simplifies the design of dialogs with very little programming knowledge. On the other hand, procedural calls allow to have very efficient local or distributed implementations with multiple simultaneous conversational applications. Efficient conversational platform capabilities require APIs interfaces. Efficient dialog manager across multiple conversational application requires exchange of procedural objects between the different subsystems, the applications and the involved CVM entities.

Figure 8:
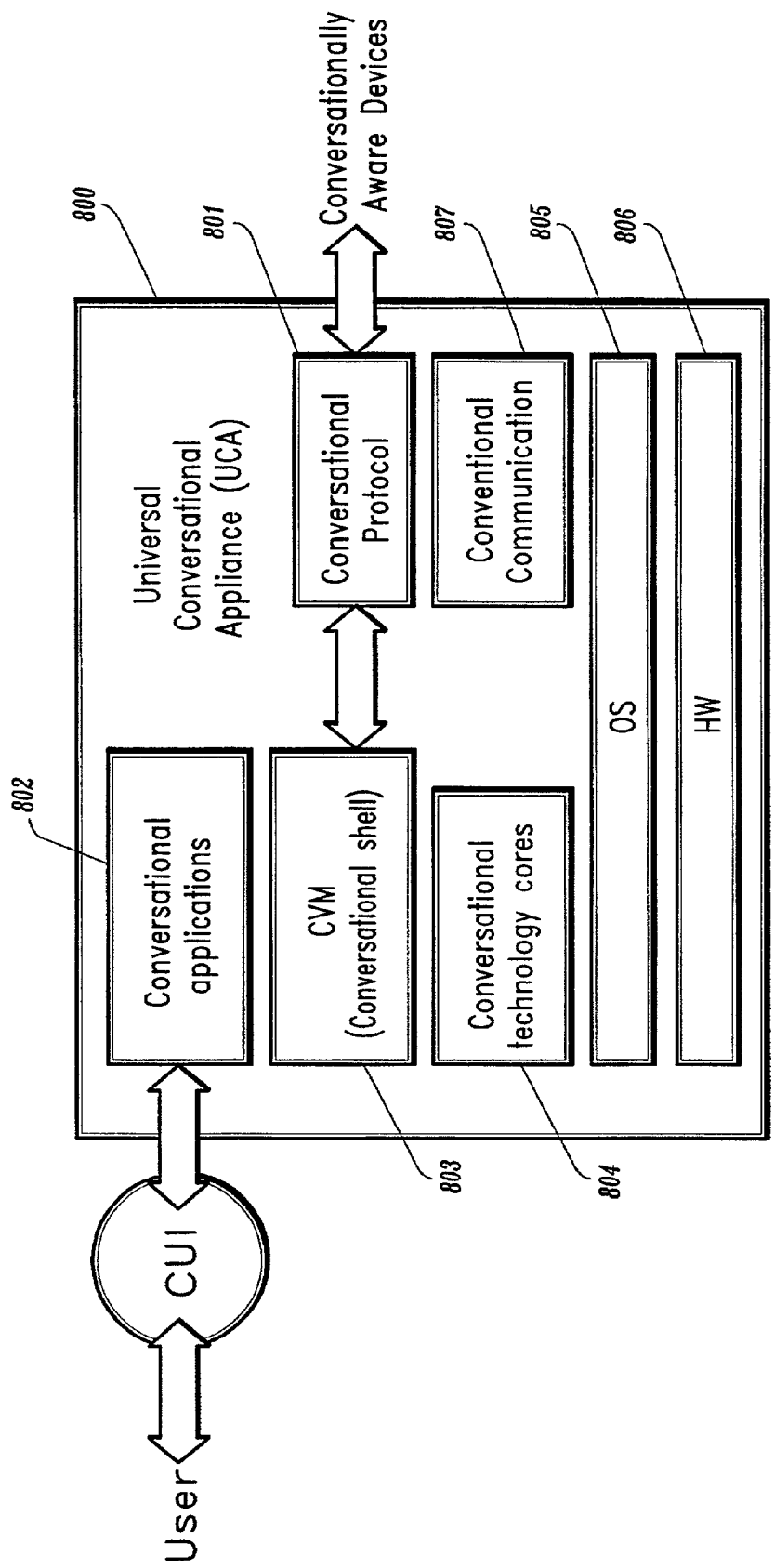
FIG. 8 is a diagram of a universal conversational appliance according to an embodiment of the present invention.

The following is an example of an application of the present invention using a UCA (Universal Conversational Appliance) also called UCRC (Universal Conversational Remote Control) as shown in FIG. 8. The UCA or UCRC is an example of CVM device involving multiple aspects of the conversational protocols. The UCRC is a speech enabled portable PDA with a spontaneous networking capability. This networking capability can be RF, ad hoc (e.g., bluetooth, hopping networking) or IR. In a home environment, appliance are now conversationally aware (but typically as silent partners). This means that the different appliance can be discovered and exchange the necessary information to be conversationally controlled. The different appliances have similar networking capabilities. In simplified cases, they are directly controlled by a "home director" type of interface using a permanent network like X10. In this instance, the UCA then rather directly talks to the home director.

The UCRC periodically (very often) broadcasts request for handshake (discovery) via the conversational protocols 801 (as discussed above). Each appliance (or the home director) answers when detecting such request. Any new discovered appliance identifies itself. The UCRC also identifies itself. The resulting handshake leads to a registration.

The registration, includes identifying the nature and name of the appliance (and any other meta-information) and the fact that it is a silent partner, which then leads to a negotiation.

In this instance, the negotiation immediately agrees that the UCRC drives the conversation. The newly discovered appliance exchanges its current state and the commands that it supports in that state. When supporting limited amounts of commands, it may also send the other states that it supports and the commands associated to these other states. This is equivalent to sending a structure skeleton in advance. When the structure of states is too complex, this information will be done on a state by state basis every time that the state change.

The exchange process involves exchanging a list of commands with return handles/events to return to the appliance upon activation, plus possibly all the necessary data files:—vocabulary, baseforms, prompts/voice fonts for the dialog, grammars, possibly parsing, translation, tagging, symbolic language and language generation rules for NL interfaces. Alternatively, the information may involve addresses of other engines that will perform the conversational engine tasks (e.g. a server that will perform the speech recognition task etc). Upon activation and input from the user, the UCRC CVM determines the associate appliance. This may be based on recognition results according to the commands supported by different appliances (locally or remotely as described in Ser. No. 09/806,425).

Upon decision, the event/return handle is activated and the command is executed on the associated appliance. This results into a change of state. The new state is communicated to the UCRC. The context on the UCRC is also updated. Commands are updated (based on the skeleton or based on a new exchange of supported commands. When an appliance temporarily disappears from the network, the information is stored in the context (if the appliance is still to be controlled by the UCRC. This can be based on time (how long ago was it last seen) or location (meta-information) or in the meta-information (if deactivated). Upon reactivation, most of the information is reloaded from the context or meta-information and the protocols only check for updates.

When an appliance is explicitly removed from the controlled list, the request of sign-in off can come explicitly from the appliance or from the UCRC. When the appliance is controlled conventionally (conventional remote control of the TV, or switches for the lights etc.), events are returned to the UCRC to reregister/renegotiate or rather just update the context, data file and state of the appliance.

Note that when a home director is used, the protocols are exactly the same, except that two models can be taken:

1) only one application is registered: the home director. Any appliance change or any command result in a change of the state of the overall home director;

2) all the individual appliance are registered with the UCRC. The home director acts only as a gateway that transmits and transcode the protocols between the appliances and the UCRC.

When a home director model is considered, it is possible to extend the functionalities offered by the UCRC. Instead of spontaneous networking, it could just be a regular wireless LAN (Ethernet, RF to a base station connected to the home director). When out of range the home director solution presents the advantage to be callable by regular phone (e.g. modem type of connection). In such case all the protocols can now be exchanged over the phone. Therefore a new UCRC topology is: a cell phone/UCRC with local or spontaneous network capabilities when within ranges and binary connections to the base station capabilities when out of range for control away from home.

Alternatively, the UCRC capabilities can also be duplicated or limited to the home director machine. When duplicated, if the machine can offer speech browsing capability or local home IVR capabilities via a telephony card the home appliances can now be controlled y voice from any where through the phone (without needing a binary connection through a C and server exchanging conversational protocols. The UCRC and conversational protocols are rather between the home director and the appliances. Any regular phone can be used. In the second case, usually the server will also be used to control the appliances when at home. The UCRC becomes rather just a portable I/O system: it capture the audio, compress and ship it (conversational Coding) to the home director. Output are similarly shipped to the UCRC for play back. All the actual CVM processing is now done on the home director server.

Figure 12:
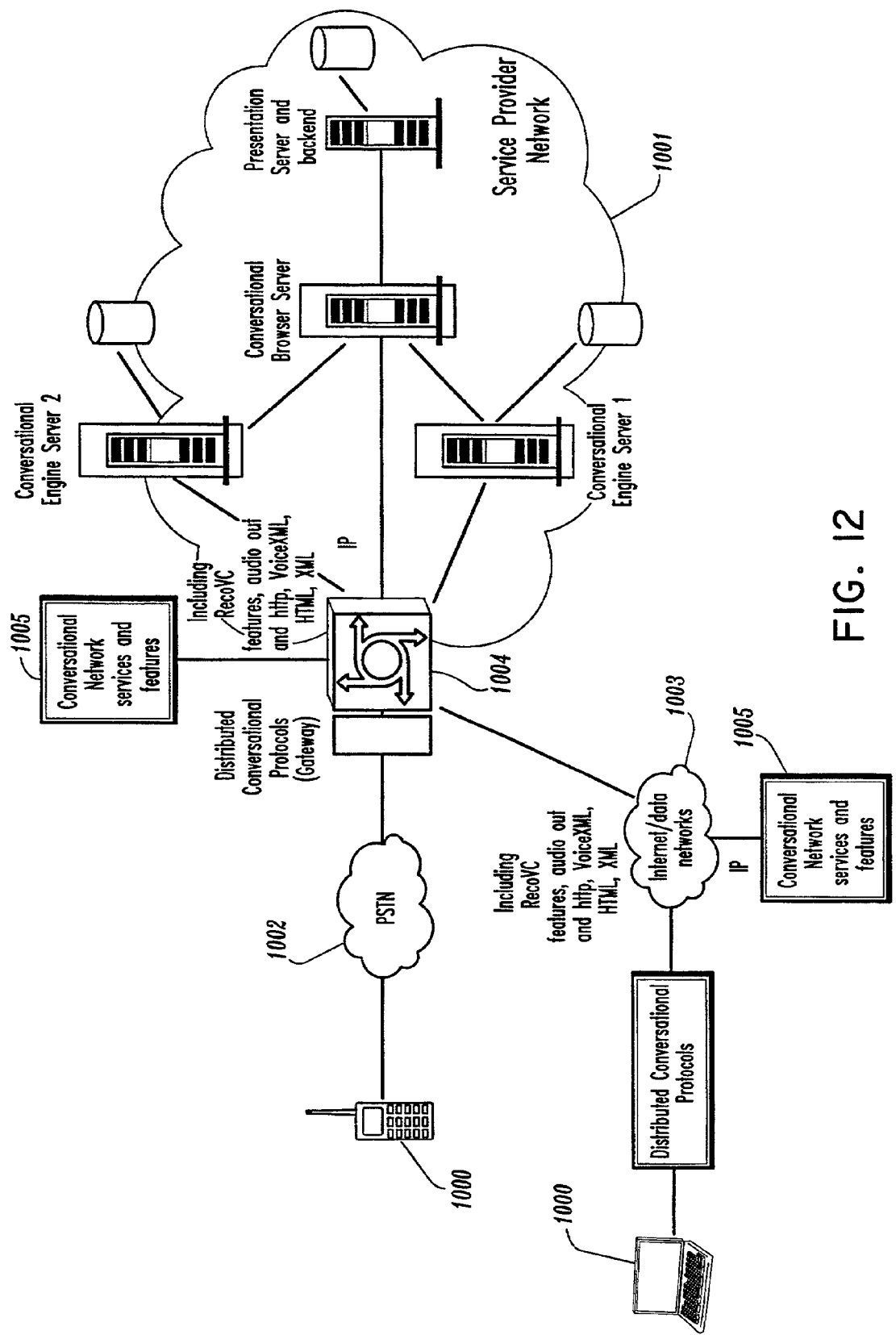
FIG. 12 is a diagram illustrating conversational networking according to the present invention.

Referring now to FIG. 12, a diagram illustrates a conversational network system which may be constructed using the components and features described herein. It is to be understood that conversational computing according to the present implies new requirements in terms of the networking of the different devices. This means that the main consideration in all the protocols, load and traffic management and network caching and storage is not just to guarantee balance of the load or traffic but, in addition, to optimize the dialog flow of all active dialog of users present conversing on the network or using the networked resources. In other words, the conversational distributed architecture adds new additional constraints or consideration to optimize: the delay and flow of the dialog, the delay in transmitting audio (conversational coding), synchronizing speech and the GUI components (indeed, a GUI input must result in an event and a synchronized/coordinated behavior of a speech component and a GUI component of the UI) and updating and exchanging the underlying conversational protocols (negotiation, dialog manager protocols etc.). Such aspects play an important role if seamless and transparent processing locally and/or on the network is desired. Quality of service, bandwidth, minimum delay, minimum packet loss etc remain as important as for VoIP.

Additionally there is the problem of adequate transfer of the data files that are needed for a specific task and domain to the appropriate engine. Again, this requires caching or storage on the network and extra precision traffic management and load management. Again, a concept that is not present even for VoIP where only the flow of the traffic between the sender and receiver matters. In addition, even the skeleton information (i.e., dialog logic) can be prestored or cached or duplicated appropriately in the network to improve efficiency.

In the system depicted in FIG. 12, client devices 1000 (equipped with CVM system or dialog manager capabilities) according to the present invention can access desired information from a service network provider network 1001 by connecting via a PSTN 1002 and internet/intranet 1003 networks through router 1004. The router 1004 and internet/intranet network 1003 provide conversational network service extensions and features including distributed conversational protocols (discussed above), audio coding via RecoVC (Recognition Compatible VoCoder), applications and meta-information (distributed application protocol), discovery, registration, negotiation protocols, server load management to maintain dialog flow, traffic balancing and routing to maintain dialog flow, engine server selection based on task features and capability requirements and conversational argument availability (data files), conversational arguments (distribution: storage), traffic/routing and caching.

In any network (internet, bluetooth, wireless network etc . . . ) such as shown in FIG. 12, as well as on the intranet of a conversational application service or content or transaction provider, the network will have content servers and backend logic or business logic server, conversational engine servers, gateway, routers, proxies and IVR (e.g. like a sound card) and server browsers, where audio and data files are continuously exchanged between the resources according to the optimization imposed by the conversational networking principle.

Accordingly, the CVM components or conversational services need to be present on all these entities (server, client, gateway, router, etc . . . ) to exchange message for performing the conversational networking measurements, transmission, management and execution of the different functions. Typically these functions are executed on top of existing protocols and system to perform load balancing, traffic balancing, storage and caching in the network etc.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A conversational computing system, comprising:
   a multi-modal CUI (conversational user interface) manager, operatively connected to a plurality of I/O (input/output) renderers, which can receive input queries and input events across different user interface modalities of different active applications and generate output messages and output events in connection with the active applications in one or more of the different user interface modalities;
   a conversational kernel for generating multi-modal dialogs in response to the input queries and input events, and for managing context associated with the active applications;
   a conversational API (application program interface) for providing an interface between the active applications and the conversational kernel;
   a plurality of I/O resources; and
   an I/O API for interfacing with the plurality of I/O resources and for registering the plurality of I/O resources with the conversational kernel.

2. The system of claim 1, further comprising:
   a conversational engine API; and
   a plurality of conversational engines, wherein the conversational kernel controls and accesses the conversational engines through the conversational engine API to process the input queries and input events and to generate the multi-modal dialog and output events.

3. The system of claim 2, wherein the conversational engines comprise NLU (natural language understanding) and NLG (natural language generation) engines, and wherein the multi-modal dialogs comprise NLU and NLG dialogs.

4. The system of claim 3, wherein the conversational kernel provides support at the dialog management level for NL (natural language) and use of context for disambiguation and mixed initiative.

5. The system of claim 1, wherein the conversational kernel provides conversational services and behaviors that are accessible by an application through the conversational API.

6. The system of claim 5, wherein the conversational services and behaviors comprise one of conversational security, conversational customization, conversational search, conversational selection, conversational help, conversational memorization, conversational summarization, conversational agents, conversational formatting, conversational prioritization, conversational re-direction, conversational categorization, conversational abstraction and object management, conversational navigation, conversational undo, and a combination thereof.

7. The system of claim 1, wherein the conversational API comprises a library comprising library functions of conversational foundation classes (CFCs) and fundamental dialog components, wherein the CFCs and fundamental dialog components are accessible through the library for constructing conversational objects, wherein the conversational objects are employed for one of performing conversational procedures and building conversational applications.

8. The system of claim 7, wherein the CFCs can share context and be activated in parallel within an application or across a plurality of applications.

9. The system of claim 8, wherein the CFCs and fundamental dialog components comprise one of CUI building blocks, conversational platform libraries, dialog modules, dialog scripts, beans, conversational gestures, and a combination thereof.

10. The system of claim 9, further comprising a conversational browser, wherein the CFCs, dialog components, CUI building blocks, conversational platform libraries, dialog modules, dialog scripts, beans, conversational gestures, and conversational API are loaded into the system through CML (conversational markup language) pages that are processed via the conversational browser.

11. The system of claim 7, wherein the conversational objects are implemented one of declaratively, imperatively and a combination thereof.

12. The system of claim 1, wherein the conversational kernel is a platform that executes on top of one of an operating system, a real-time operating system, a virtual machine and a browser.

13. The system of claim 1, wherein the conversational kernel executes as an operating system service layer.

14. The system of claim 1, wherein the system executes on one of a personal computer platform, a server platform, an embedded client device platform and a distributed combination of these platforms.

15. The system of claim 1, wherein the conversational kernel comprises a conversational transcoder for providing adaptation of the behavior, CUI and dialog presented to a user based on capabilities of the I/O resources and conversational engines.

16. The system of claim 1, wherein the I/O API layer comprises one of I/O abstractions, user interface abstractions, device abstractions and a combination thereof.

17. The system of claim 1, wherein the conversational kernel comprises:
   a dialog manager for managing dialog across active applications and for selecting an active dialog, context and application based on input queries;
   a resource manager for managing and allocating conversational engines that are used during execution of conversational tasks;

a conversational task dispatcher for coordinating and dispatching conversational tasks; and a context stack for accumulating a context of an active discourse of a conversational task, the context comprising query arguments, a list of attribute value—uples and conversational state.

18. The system of claim 17, wherein the context stack comprises a global history of context.

19. The system of claim 17, wherein the context stack comprises a meta-information repository.

20. The system of claim 19, wherein the meta-information repository comprises a-priori known information.

21. The system of claim 19, further comprising a meta information manager for managing the meta-information repository, wherein the meta-information comprises a plurality of abstract categories associated with elements comprising one of files, directories, objects, data stream handles, networks, peripherals, hardware, applications, networked file systems and a combination thereof.

22. The system of claim 21, wherein the meta-information is used to provide shortcuts to the elements.

23. The system of claim 21, wherein a user can navigate the categories of the meta-information through multi-modal conversational dialogs that comprise filling sets of attribute values out of a set of possible query types, and wherein the user can refine or modify the result of current navigation queries based on similarities of the corresponding categories.

24. The system of claim 21, wherein the meta-information provides a-priori knowledge information for the categories of meta-information.

25. The system of claim 19, wherein the meta-information comprises user meta-information representing one of user preferences, security, habits, biometrics, behavior and a combination thereof.

26. The system of claim 25, wherein the user meta-information is one of provided directly by the user, learned from past usage of the system by the user, and a combination thereof.

27. The system of claim 17, wherein the conversational kernel further comprises a back-end abstraction layer for accessing back-end logic via the dialog manager.

28. A conversational computing system, comprising:

a multi-modal CUI (conversational user interface) manager, operatively connected to a plurality of I/O (input/output) renderers, which can receive input queries and input events across different user interface modalities of different active applications and generate output messages and output events in connection with the active applications in one or more of the different user interface modalities;

a conversational kernel for generating multi-modal dialogs in response to the input queries and input events, and for managing context associated with the active applications;

a conversational API (application program interface) for providing an interface between the active applications and the conversational kernel; and a communication stack that implements conversational protocols for exchanging information with a conversationally aware system, wherein the conversationally aware system comprises one of a remote application, a remote device, a remote conversational computing system, and a combination thereof.

29. The system of claim 28, wherein the conversational protocols comprise distributed conversational protocols for exchanging information comprising one of conversational state, conversational arguments, context, conversational engine API calls, results, and a combination thereof.

30. The system of claim 28, wherein information exchanged between applications through the conversational protocols comprises a description of a conversational state of the applications, wherein the information representing a conversational state comprises one of a grammar, a vocabulary, acoustic models, language models, prompts, synthesis details, parsing details, tagging details, information to manage the dialog, and a combination thereof.

31. The system of claim 28, wherein information exchanged through the conversational protocols comprises a modality-independent description of an interface of a remote control unit, wherein the interface allows the user to remotely control a conversationally aware appliance though the remote control unit.

32. The system of claim 28, wherein the conversational protocols comprise conversational discovery protocols for automatically discovering the conversationally aware systems, and wherein the information exchanged through the conversational discovery protocols comprises broadcast requests for handshake, exchange of identifiers, exchange of handles for first registration and exchange of handles for first negotiation.

33. The system of claim 28, wherein the conversational protocols comprise conversational negotiation protocols for exchanging information to negotiate network topology between the system and a conversationally aware system.

34. The system of claim 28, wherein the conversational protocols comprise conversational registration protocols for exchanging registering information, wherein the registering information comprises one of conversational capabilities, conversational state, context, and a combination thereof.

35. A computer readable medium having stored thereon a set of instructions that are executable by a computer to implement a conversational virtual machine, the conversational virtual machine comprising:

a kernel adapted to manage dialog and context, conversational engines and resources and communication across different platforms, applications, devices or combinations thereof, each having one or more different user interface modalities, to provide a coordinated, universal conversational user interface (CUI) across the different user interface modalities;

an API (application program interface) comprising abstractions adapted to access conversational services from the kernel on behalf of said platforms, applications, and devices or combinations thereof;

a dialog manager adapted to manage conversational dialog across registered applications; and a context stack for maintaining the context of an active application or task under the control of the dialog manager.

36. The computer readable medium of claim 35, wherein the conversational virtual machine is a shell that executes on top of one of an operating system, a real-time operating system, a virtual machine, and a conversational browser.

37. The computer readable medium of claim 35, wherein the conversational virtual machine executes as an operating system service layer.

38. The computer readable medium of claim 35, further comprising an engine API comprising abstractions adapted to access a conversational engine.

39. The computer readable medium of claim 35, wherein the API comprises a plurality of conversational foundation classes that are accessible through library functions for building one of conversationally aware applications, dialog components for performing specific reusable dialog tasks, and both.

40. The computer readable medium of claim 39, wherein the conversational foundation classes comprise conversational gestures that characterize a modality-independent dialog.

41. The computer readable medium of claim 35, wherein the conversationally aware applications and dialog components are implemented one of declaratively, imperatively, and a combination thereof.

42. The computer readable medium of claim 35, wherein the kernel comprises a task manager adapted to drive a conversational engine and a task, process or thread running on the conversational virtual machine.

43. The computer readable medium of claim 35, wherein the kernel comprises:
 a resource manager adapted to manage one of local resources, distributed resources, and both; and
 an input/output (I/O) manager adapted to manage multi-modal I/O events.

44. The computer readable medium of claim 35, wherein the kernel further comprises an arbitrator for arbitrating a target application of an I/O event between the registered applications.

45. The computer readable medium of claim 35, wherein the API comprises conversational protocols adapted to provide distribution of the conversational virtual machine.

46. The computer readable medium of claim 45, wherein the distribution of the conversational virtual machine comprises distribution of functions and components of the conversational virtual machine across multiple devices or resources that collectively contribute to providing a complete functionality of the conversational virtual machine.

47. The computer readable medium of claim 45, wherein the distribution of the conversational virtual machine comprises distribution of functions of the conversational virtual machine among a plurality of conversational virtual machines.

48. The computer readable medium of claim 47, wherein the role of each of the plurality of conversational virtual machines is dynamically negotiated between the conversational virtual machines.

49. The computer readable medium of claim 45, wherein the distribution of the conversational virtual machine comprises distribution of the dialog manager and context stack across the registered applications.

50. The computer readable medium of claim 45, wherein the conversational protocols comprise conversational distributed protocols adapted to allow coordination of a dialog among a plurality of applications and devices.

51. The computer readable medium of claim 50, wherein the plurality of applications and devices comprise silent partners.

52. The computer readable medium of claim 45, wherein the conversational protocols comprise negotiation protocols adapted to allow the kernel to dynamically negotiate one of a master/slave, a client/server, and a peer-to-peer topology with at least one kernel of a remote conversational virtual machine.

53. The computer readable medium of claim 35, wherein the conversational virtual machine transcribes input events into ASCII input streams and processes the ASCII input streams as objects.

54. The computer readable medium of claim 53, wherein the ASCII input streams comprise a list of attribute-value n-uples.

55. The computer readable medium of claim 35, wherein the conversational virtual machine is implemented as an interface for a UCRC (universal conversational remote control), wherein the UCRC is used to control home appliances that are conversationally aware.

56. The computer readable medium of claim 55, wherein the UCRC comprises a speech-enabled PDA (personal digital assistant) device.

57. A computer readable medium having stored thereon a set of instructions that are executable by a computer to implement a conversational virtual machine, the conversational virtual machine comprising:
 a kernel adapted to manage dialog and context conversational engines and resources and communication across different platforms, applications, devices or combinations thereof, each having one or more different user interface modalities, to provide a coordinated, universal conversational user interface (CUI) across the different user interface modalities;
 an API (application program interface) comprising abstractions adapted to access conversational services from the kernel on behalf of said platforms, applications, and devices or combinations thereof,
 wherein the conversational virtual machine compares dialogs with conversational logic.

58. The computer readable medium of claim 57, wherein the conversational logic comprises logic statements including one of true, false, incomplete, ambiguous, different/equivalent for ASCII comparison, different/equivalent for NLU-converted query comparison, different/equivalent for active query field comparison, unknown, incompatible, incomparable, and a combination thereof.

59. A conversational computing system, comprising:
 a multi-modal CUI (conversational user interface) manager, operatively connected to a plurality of I/O (input/output) renderers, which can receive input queries and input events across different user interface modalities of different active applications and generate output messages and output events in connection with the active applications in one or more of the different user interface modalities;
 a conversational kernel for generating multi-modal dialogs in response to the input queries and input events, and for managing context associated with the active applications;
 a conversational API (application program interface) for providing an interface between the active applications and the conversational kernel;
 wherein the conversational kernel comprises:
 a dialog manager for managing dialog across active applications and for selecting an active dialog, context and application based on input queries;
 a resource manager for managing and allocating conversational engines that are used during execution of conversational tasks;
 a conversational task dispatcher for coordinating and dispatching conversational tasks; and
 a context stack for accumulating a context of an active discourse of a conversational task, the context comprising query arguments, a list of attribute value—uples and conversational state.

60. The system of claim 59, wherein the context stack comprises a global history of context.

61. The system of claim 59, wherein the context stack comprises a meta-information repository.

62. The system of claim 61, wherein the meta-information repository comprises a-priori known information.

63. The system of claim 61, further comprising a meta information manager for managing the meta-information repository, wherein the meta-information comprises a plurality of abstract categories associated with elements comprising one of files, directories, objects, data stream handles, networks, peripherals, hardware, applications, networked file systems and a combination thereof.

64. The system of claim 63, wherein the meta-information is used to provide shortcuts to the elements.

65. The system of claim 63, wherein a user can navigate the categories of the meta-information through multi-modal conversational dialogs that comprise filling sets of attribute values out of a set of possible query types, and wherein the user can refine or modify the result of current navigation queries based on similarities of the corresponding categories.

66. The system of claim 63, wherein the meta-information provides a-priori knowledge information for the categories of meta-information.

67. The system of claim 61, wherein the meta-information comprises user meta-information representing one of user preferences, security, habits, biometrics, behavior and a combination thereof.

68. The system of claim 67, wherein the user meta-information is one of provided directly by the user, learned from past usage of the system by the user, and a combination thereof.

69. The system of claim 59, wherein the conversational kernel further comprises a back-end abstraction layer for accessing back-end logic via the dialog manager.

* * * * *